(12) United States Patent
Barron et al.

(10) Patent No.: US 6,936,306 B1
(45) Date of Patent: Aug. 30, 2005

(54) CHEMICAL CONTROL OVER CERAMIC POROSITY USING CARBOXYLATE-ALUMOXANES

(75) Inventors: Andrew R. Barron, Houston, TX (US); Diane Amy Bailey, Chicago, IL (US); Mark Robert Wiesner, Houston, TX (US); Christopher Daniel Jones, Houston, TX (US); Rhonda Lynn Callender, Houston, TX (US)

(73) Assignee: William Marsh Rice University, Houston, TX (US)

( * ) Notice: Subject to any disclaimer, the term of this patent is extended or adjusted under 35 U.S.C. 154(b) by 0 days.

(21) Appl. No.: 09/670,230

(22) Filed: Sep. 28, 2000

Related U.S. Application Data

(63) Continuation of application No. PCT/US99/06137, filed on Mar. 26, 1999.
(60) Provisional application No. 60/079,926, filed on Mar. 30, 1998.

(51) Int. Cl.$^7$ ................................................ B05D 3/02
(52) U.S. Cl. ........................ 427/226; 264/621; 264/628
(58) Field of Search ............................. 264/621, 628, 264/681; 427/226, 243, 244, 430.1, 443.2

(56) References Cited

U.S. PATENT DOCUMENTS

| | | | |
|---|---|---|---|
| 4,496,714 A | 1/1985 | Murata et al. | 528/272 |
| 4,676,928 A | 6/1987 | Leach et al. | 252/313.1 |
| 4,952,634 A | 8/1990 | Grossman | 525/190 |
| 5,212,261 A | 5/1993 | Stierman | 525/506 |
| 5,418,298 A | 5/1995 | Laine et al. | 525/389 |
| 5,593,781 A | 1/1997 | Nass et al. | 428/403 |

FOREIGN PATENT DOCUMENTS

| | | | | |
|---|---|---|---|---|
| EP | 0 576 695 A1 | 6/1992 | | C07F/5/06 |
| WO | 9723288 | 3/1997 | | |
| WO | WO 97/24297 | 7/1997 | | C04B/38/00 |

OTHER PUBLICATIONS

Anderson et al., *Titania and Alumina Ceramic Membranes*, Journal of Membrane Science, 39 (1988) pp. 243–258.

(Continued)

*Primary Examiner*—Sean Vincent
(74) *Attorney, Agent, or Firm*—Conley Rose, P.C.

(57) ABSTRACT

This invention relates generally to a method for controlling the pore size, pore size distribution and porosity of aluminum-oxide based ceramics through the choice of substituents on carboxylate-alumoxanes and aluminum-oxide nanoparticles. The method allows for the formation of intra-granular pores in the nanometer range to be created in alumina and aluminum oxide ceramic bodies. The control over pore size and pore size distribution is accomplished through the use of different chemical substituents on the carboxylate-alumoxanes and aluminum-oxide nanoparticles. The size and distribution of pores within the alumina-oxide ceramic are dependent on the identity of the carboxylate substituents. In particular the formation of intra-versus inter-granular porosity is dependent on the identity of the carboxylate substituents. The invention also provides methods for the manufacture of ceramic coatings on ceramic and carbon fibers for composite applications and ceramic membranes with nanometer sized pores. The pore size, pore size distribution and porosity, and hence the strength, permeability and surface adhesion, of the ceramic coating is controlled by the choice of substituent on the carboxylate-alumoxane. Thermolysis of self supporting spun layers of the carboxylate-alumoxanes results in disks of alumina with controlled pore size, pore size distribution and porosity. In an alternative method a porous substrate is dipped or coated with a solution of the carboxylate-alumoxane, followed by thermolysis to produce a composite membrane.

34 Claims, 20 Drawing Sheets

OTHER PUBLICATIONS

Baltus, *Characterization of the Pore Area Distribution in Porous Membranes Using Transport Measurements*, Journal of Membrane Science, 123 (1197) pp. 165–184.

Furneaux et al., *The Formation of Controlled–porosity Membranes from Anodically Oxidized Aluminum*, Nature vol. 337, Jan. 12, 1989 (pp. 147–149).

Kim et al., *Hydraulic and Surface Characteristics of Membranes with Parallel Cylindrical Pores*, Journal of Membrane Science, 123 (1997) pp. 303–314.

Vries et al., *Thermal Stability and its Improvement of the Alumina Membrane Top–layers Prepared by Sol–gel Methods*, Journal of Materials Science, 26 (1991) pp. 715–720.

Michalske et al., *Strength and Toughness of Continuous–Alumina–Fiber–Reinforced Glass–Matrix Composites*, Journal of American Ceramic Society, vol. 71, No. 9 pp. 725–731 (1988).

Nogami, *Sol–gel Preparation of $SiO_2$ Glasses Containing $Al_2O_3$ or $ZrO_2$* Journal of Non–Crystalline Solids 178 (1994) pp. 320–326.

Okubo et al., *Preparation of y–alumina Thin Membrane by Sol–gel Processing and its Charaterization by Gas Permeation*, Journal of Materials Science 25 (1990) pp. 4822–4827.

Rezgui et al., *Control of Magnesia–alumina Properties by Acetic Acid in Sol–gel Synthesis*, Journal of Non–Crystalline Solids 210 (1997) pp. 287–297.

Shelleman et al., *Alpha Alumina Transformation in Seeded Boehmite Gels*, Journal of Non–Chrystalline Solids 82 (19986) pp. 277–285.

Wilson et al., *The Porosity of Aluminum Oxide Phases Derived from Well–Crystallized Boehmite: Correlated Electron Microscope, Adsorption, and Porosimetry Studies*, Journal of Colloid and Interface Science, vol. 82, No. 2, Aug. 1981 (pp. 507–517).

Yoldas, *Alumina Gels that Form Porous Transparent $Al_2O_2$*, Journal of Material Science.

Adkins, *The Selective Activation of Alumina for Decarboxylation or for Dehydration*, Selective Activation of Alumina pp. 2175–2186.

Courtright, *Engineering Property Limitations of Structural Ceramics and Ceramic Composites above 1600°C*, Ceramic Engineering Science Proc. 12(9–10) pp. 1725–1744 (1991).

Elaloui et al., *Influence of the Sol–Gel Processing Method on the Structure and the Porous Texture of Nondoped Aluminas*, Journal of Catalysis 166, pp. 340–346 (1997).

Sikar, *New Membrane Materials and Processes for Separation*, Published by American Institute of Chemical Engineers, 1988.

Kareiva et al., *Carboxylate–Substituted Alumoxanes as Processable Precursors to Transition Metal–Aluminum and Lanthanide–Aluminum Mixed–Metal Oxides: Atomic Scale Mixing via a New Transmetalation Reaction*, Chemistry of Materials vol. 8, No. 9, pp. 2331–2340.

Kingery et al., *Introduction to Ceramics* Wiley–Interscience Publication, 1960.

Lao et al., *Microporous Inorganic Membranes: Preparation by the Sol–gel Process and Characterization of Unsupported Composite Membranes of Alumina and Polyoxoaluminium Pillard Montmorillonite*, Journal of Materials Science Letters 13 (1994) pp. 895–897.

Low et al:, *Synthesis and Properties of Spondumene–modified Mullite Ceramics formed by Sol–gel Processing*, Journal of Materials Science Letters 16 (1997) pp. 982–984.

Nikolic et al., *Alumina Strengthening by Silica Sol–gel Coating*, Thin Solid Films 295 (1997) pp. 101–103.

Rezgui et al., *Chemistry of Sol–Gel Synthesis of Aluminum Oxides with in Situ Water Formation: Control of the Morphology and Texture*, Chem Mater (1994) 6, pp. 2390–2397.

Serna et al., *Division S–9—Sole Mineralogy*, Soil Sci. Soc. Am. Journal, vol. 41 (1997) pp. 1009–1013.

Yoldas, *Alumina Gels that Form Porous Transparent $Al_2O_3$*, Journal of Materials Science 10 (1975) pp. 1856–1860.

Y. Koide, et al; *Alumoxanes as Cocatalysis in the Palladium–Catalyzed Copolymerization of Carbon Monoxide and Ethylene: Genesis of a Structure–Activity Relationship*; Organometallics, vol. 15, No. 9. (pp. 2213–2226).

A. MacInnes, et al; *Chemical Vapor Deposition of Gallium Sulfide: Phase Control by Molecular Design*; American Chemical society, 1993; (pp. 1344–1351).

R. S. Bauer, *Epoxy Resins*, American Chemical Society, 1985 (15 p.).

C. Landry, et al; *Siloxy–Substituted Alumoxanes: Synehesis from Polydialkylsiloxanes and Trimethylaluminium, and Application as Aluminosilicate Precursors*; J. Mater. Chem. 1993; (pp. 597–6020).

K. Andriano, et al; *Synthesis of New Polymers with Inorganic Chains of Molecules*; Journal of Polymer science, vol. XXX, 1958 (pp. 513–524).

G. Whiteside et al; Articles; *Molecular Self–Assembly and Nanochemistry: A chemical Strategy for the Synthesis of Nanostructures*; Science, vol. 254, Nov. 1991; (pp. 1312–1319).

B. Yoldas; *Alumina Gels that Form Porous Transparent $Al_2O_3$* Journal of Materials Science 1975; (pp. 1856–1860).

Malcolm P. Stevens, *Polymer Chemistry, An Introduction*, Oxford University Press, 1990 (9 p.).

A. Kareiva, et al; *Carboxylate–Substituted Alumoxanes as Processable Percursors to Transition Metal–Aluminum and Lanthanide–Aluminum Mixed–metal Oxides: Atomic Scale Mixing via a New Transmetalation Reactio*; American Chemical Society 1996 (pp. 2231–2340).

C. Vogelson, et al; *Inorganic–Organic Hybrid and Composite Materials Using Carboxylate–Alumoxanes*; World Ceramics Congress, Jun. 14–19, 1998; (pp. 499–506).

J. M. G. Cowie, Professor of Chemistry, University of Stirling, *Polymers: Chemistry and Physics of Modern Materials*, Intertext Books, (13 p.).

*Thermal Conductivity of Epoxy resin–Aluminum (0 to 50%)*; and *Diavalent Chromium in Alkaline Earth Silicate Systems*; Chapman and Hall Ltd.; 1977; (pp. 1689–1691).

H. Schmidt et al., *Inorganic–Organic Hybrid Coatings for Metal and Glass Surfaces*, American Chemical Society 1995 (pp. 331–347).

H. Schmidt and H. Krug, "*Sol–gel–based inorganic–organic composite materials*", ACS Symp. Se. 572, No. Inorganic and Organometallic Polymers II, 183–194, (1994).

Y. Kimura, S. Tanimoto, H. Yamane, T. Kitao, "*Coordination Structure of the Aluminium Atoms of Poly (Methylaloxane), Poly (Isopropoxylaloxane) and Poly [Acyloxy) Aloxane]*", Polyhedron, vol. 9, No. 2/3, 371–376, (1990).

Harry S. Katz, et al. *Handbook of Fillers and Reinforcements for Plastics*, Van Nostrand Reinhold Company, 1978 (49 p.).

Bryan Ellis, *Chemistry and Technology of Epoxy Resins*, Blackie Academic & Professional, an Imprint of Chapman & Hall, (80 p.).

R. Kasemann, H. Schmidt; *Coatings for Mechanical and Chemical Protection based on Organic–Inorganic Sol–Gel Nanocomposites*; New Journal of Chemistry, vol. 18, No. 10–1994; (pp. 1117–1123).

C. T. Vogelson, et al; *Inorganic–Organic Hybrid and Composite Materials Using Carboxylate–Alumoxanes*; (undated) (pp. 8).

S. Pasynkiewicz, *Alumoxanes: Synthesis, Structures, Complexes and Reactions*, Polyhedron, vol. 9, No. 2/3, 1990 (25 p.).

K. Nakamae, et al; *Studies on Mechanical Properties of Polymer Comnposites by X–Ray diffraction: 3. Mechanism of Stress Transmission in Particulate Epoxy Composite by X–Ray Diffraction*; Polymer, 1992, vo.. 33, No. 13; (pp. 2720–2724).

H. Jullien, et al. *The Microwave Reaction of Phenyl Glycidyl Ether with Aniline on Inorganic Supports: a Model for the Microwave Crosslinking of Epoxy Resins*; Polymer, vol. 37, No. 15; 1996; (pp. 3319–3330).

H. Schmidt, et al; *Chemistry and Applications of Inorganic–Organic Polymers*; Mat. Res. Soc. –Symp. Prac. vol. 73; 1986; (pp. 739–750).

J. deWit, et al; *Evaluation of Coating—A Total System Approach*; Materials Science Forum, vol. 247 (1997) (pp. 69–82).

Jacqueline I. Kroschwitz, et al., *Encyclopedia of Polymer Science and Engineering*, vol. 6, *Emulsion Polymerization to Fibers, Manufacture*, A Wiley–Interscience Publication, 1985, (66 p.).

Christopher C. Landry, et al., *From Minerals to Materials: Synthesis of Alumoxanes from the Reaction of Boehmite with Carboxylic Acids*, Department of Chemistry, Harvard University, 1995 (11 p.).

A. Apblett, et al; *Synthesis and Characterization of Triethylsiloxy–Suybstituted Alumoxanes: Their Structural Relationship to the Minerals Boehmite and Diaspore*; American Chemical Society; 1992; (pp. 167–181).

Y, Koide, et al; $[Al_5(Bu)_{5(\mu_3}-O)_2((\mu-OH)_2(\mu-O_{2\ Ph})_2]$: *A Model for the Interaction of Carboxylic Acids with Boehmite*; American Chemical Society 1995; (pp. 4025–4029).

International Search Report for Application No. PCT/US99/06137 dated Jul. 6, 1999 (4 p.).

Kareiva et al.; *Carboxylate–Substituted Alumoxanes as Processable Precursors to Transition Metal–Aluminum and Lanthanide–Aluminum Mixed–Metal Oxides: Atomic Scale Mixing via a New Transmetalation Reaction*; Chemistry of Materials, vol. 8, No. 9, 1996 (pp. 2331–2340).

Callender et al., *Aqueous Synthesis of Water–Soluble Alumoxanes: Environmentally Benighn Precursors to Alumina and Aluminum–Based Ceramics*; Chemistry of Materials, vol. 9, No. 11, Nov. 1, 1997 (pp. 2418–2433).

Chemical Abstracts, vol. 111, No. 24, Dec. 11, 1989, abstract No. 218306m, UHLHORN, R.J.R.: High permselectivities of microporous silica modified gamma–alumina membranes: XP000181419.

Precursor "Particles"

Sintered "Particles"

Bright Field images show pores as lighter areas

Dark Field images show individual $Al_2O_3$ microcrystals as light areas.

Grain size is ~2 microns.

SAD Pattern Corresponding to [111] zone axis of alumina

Akzo Fortafil 3C(unt)
7 μm carbon fibers, uncoated

Akzo Fortafil 3C(unt)
7 μm carbon fibers, YAG coated

Uncoated Fiber

Hibonite Coated Fiber

CHEMICAL CONTROL OVER CERAMIC POROSITY USING CARBOXYLATE-ALUMOXANES

CROSS-REFERENCE TO RELATED APPLICATIONS

This is a continuation of International PCT Serial No. PCT/US99,06137, filed Mar. 26, 1999, entitled Chemical Control Over Ceramic Porosity Using Carboxylate-Alumoxanes, and further claims priority from U.S. Ser. No. 60/079,926 filed Mar. 30, 1998.

STATEMENT REGARDING FEDERALLY SPONSORED RESEARCH ORDEVELOPMENT

Not Applicable.

BACKGROUND OF THE INVENTION

1. Field of the Invention

The present invention relates generally to compositions of matter and methods for synthesizing a composition of matter including controlling the pore size, pore size distribution and porosity of aluminum-oxide based ceramics through the choice of substituents on carboxylate-alumoxanes and aluminum-oxide nanoparticles. The invention includes aluminum and aluminum oxide ceramic bodies with intra-granular pores in the nanometer range and methods for forming intra-granular pores in the nanometer range in alumina and aluminum oxide ceramic bodies. The invention provides for the control over pore size and pore size distribution by the use of chemical substituents on the carboxylate-alumoxanes and aluminum-oxide nanoparticles. The invention also includes the use of controlled-porosity ceramics for ceramic membrane filters and coatings and interphase layers for fibers and fiber reinforced composites.

2. Description of the Related Art

The oxides and hydroxides of aluminum are undoubtedly among the most industrially important chemicals. Their uses include: precursors for the production of aluminum metal, catalysts and absorbents; structural ceramic materials; reinforcing agents for plastics and rubbers, antacids and binders for the pharmaceutical industry; and as low dielectric loss insulators in the electronics industry. Traditional ceramic processing involves three basic steps generally referred to as powder-processing, shape-forming, and densification, often with a final mechanical finishing step (Kingery et al. 1976 and Richerson 1992). Whereas traditional sintering process are primarily for the manufacture of dense parts, solution-gelation processes have been applied industrially used for the production of porous materials and coatings. Solution-gelation involves a four stage process: dispersion; gelation; drying; and firing. A stable liquid dispersion or sol of the colloidal ceramic precursor is initially formed in a solvent with appropriate additives. By change in the concentration (aging) or the pH, the dispersion is polymerized to form a solid dispersion or gel. The excess liquid is removed from this gel by drying, and the final ceramic is formed by firing the gel at higher temperatures. The common solution-gelation route to aluminum oxides employs aluminum hydroxide (or hydroxide-based material) as the solid colloid, with the second phase being water and/or an organic solvent. Aluminum hydroxide gels have traditionally been prepared by the neutralization of a concentrated aluminum salt solution (Serna et al. 1977), however, the strong interactions of the freshly precipitated alumina gels with ions from the precursor solutions makes it difficult to prepare these gels in pure form (Green and Hem 1974). To avoid this complication alumina gels may be prepared from the hydrolysis of aluminum alkoxides, $Al(OR)_3$ (Eq. 1).

$$Al(OR)_3 \xrightarrow{H_2O} Al\text{-gel} \xrightarrow{\Delta} Al_2O_3 \tag{1}$$

Although this method was originally reported by Adkins in 1922, it was not until Teichmer et al. (1976) reported the preparation of alumina aerogels, and Yoldas (1975) showed that transparent ceramic bodies can be obtained by the pyrolysis of suitable alumina gels, that interest increased significantly. Other pertinent references include: Nogami (1994), Low et al. (1997), Nikolic and Radonjic (1997), Rezgui and Gates (1997), Rezgui et al. (1994). The exact composition of the gel in commercial systems is ordinarily proprietary, however, a typical composition will include an aluminum compound, a mineral acid and a complexing agent to inhibit premature precipitation of the gel. The aluminum compound has traditionally been the direct precursor to pseudo-boehmite.

The aluminum based sol-gels formed during the hydrolysis of aluminum compounds belong to a general class of compounds, namely alumoxanes. These materials were first reported in 1958 (Andrianov and Zhadanov, 1958) with siloxide substituents, however, they have since been prepared with a wide variety of substituents on aluminum. Recent work has shown that the structure of alumoxanes is as three dimensional cage compounds (Apblett et al. 1992 and Landry et al. 1993). For example, siloxy-alumoxanes, $[Al(O)(OH)_x(OSiR_3)_{1-x}]_n$, consist of an aluminum-oxygen core structure (FIG. 1) analogous to that found in the mineral boehmite, $[Al(O)(OH)]_n$, with a siloxide substituents. In the siloxy-alumoxanes, the "organic" is typically like that shown in FIG. 2. However, the carboxylate anion, $[RCO_2]^-$, is an isoelectronic and structural analog of the organic portion found in the siloxy-alumoxanes (FIG. 3). Based upon this approach the reaction of boehmite, $[Al(O)(OH)]_n$, with carboxylic acids, has been developed (Landry et al. 1995) or Eq. 2.

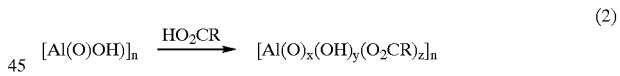

$$[Al(O)OH]_n \xrightarrow{HO_2CR} [Al(O)_x(OH)_y(O_2CR)_z]_n \tag{2}$$

Carboxylate-substituted alumoxanes have been well characterized (Landry et al. 1995 and Callender et al. 1997). Solution particle-size measurements shows that carboxylate-alumoxanes are nano-particles with sizes ordinarily ranging from 1–1000 nm (FIG. 10, 11 and 12). Nano-particles are ordinarily defined as materials with sizes ranging from 1 nm to 1 $\mu$m. The carboxylate ligand is bound to the aluminum surface, and is only removed under extreme conditions. The carboxylate-alumoxane materials prepared from the reaction of boehmite and carboxylic acids are air and water stable materials and are easily processable (FIG. 7). The soluble carboxylate-alumoxanes can be dip-coated, spin coated, and spray-coated onto various substrates. The physical properties of these alumoxanes are highly dependent on the identity of the alkyl substituents, R, and range from those associated with insoluble crystalline powders to powders that readily form solutions or gels in hydrocarbon solvents and/or water. These alumoxanes are indefinitely stable under ambient conditions, and are adaptable to a wide range of processing techniques. The alumoxanes can be easily converted to aluminum oxide upon mild thermolysis, while they also react with metal complexes to form doped or mixed aluminum oxides (Kareiva et al. 1996).

The control of porosity (pore size, pore size distribution and pore density) is an important aspect of ceramics. Lower porosity improves strength, load-bearing capacity, and corrosion resistance, but can also lead to catastrophic failure from thermal shock, because the pores present act as crack stoppers in more porous ceramics. Cracks propagate intergranularly (between grains) and therefore the grain boundary toughness plays a large role in determining the fracture mode. Porosity between grains can promote crack propagation and lower the strength of a ceramic body. In both traditional and sol-gel processes, the porosity of the resulting ceramic is controlled through physical processing variables (Wilson and Stacey, 1981), such as the time or temperature of firing and the addition of pre-fired additives to seed crystal growth (Shelleman et al. 1986). Direct chemical control has not been observed. Furthermore, the pore size, pore size distribution and porosity are functions of the ceramic particles used to make the ceramic body, because the porosity is determined by the gaps between the individual particles (FIG. 4) and is therefore inter-granular, that is between the crystal grains. For example, pores below 0.1 $\mu$m in diameter require that submicron powders be used (in traditional ceramic processing), while smaller pores require sol-gel processing.

A particularly important area where the strength and porosity of ceramic materials is affected by the formation of inter-phase materials in fiber reinforced ceramic matrix and metal matrix composites. Fiber reinforced ceramic matrix composites (FRCMCs) are potential candidates for use in high temperature structural applications (Courtright, 1991). For example, aerospace applications include high thrust-to-weight ratio gas turbine engines and high-specific-impulse rocket motors. Ground based applications include, high efficiency turbine and diesel engines. In each of these applications there is a need for high performance ceramic materials that can be readily fabricated into complex shapes. Compared to current materials (e.g., nickel based superalloys) and proposed metallic and intermetallic matrix composites, FRCMCs have higher strengths at lower densities, higher maximum use temperatures, and better oxidation resistance. Ceramic materials are well known for their stability at high temperatures, adequate strength and resistance to corrosion, and can meet most of the requirements for gas turbine applications. However, the brittle nature of ceramic materials and their tendency to undergo catastrophic failure has limited their usefulness. By reinforcing ceramic materials with fibers, catastrophic failures can be reduced or eliminated. A major drawback in existing fiber reinforced ceramic matrix composites (FRCMCs) is the absence of a fiber-matrix interface (or interphase) that is weak and stable over the entire range of expected use. Limitations of such prior art FRCMCs are the instability of known interfaces and the chemical reactivity of many weak interphases with the fiber and/or matrix. The chemical design of interfaces to optimize the adhesion or transfer of load between reinforcing phase and the matrix, to enhance crack deflection through debonding or to control interfacial reactivity/stability are an important development. For both the fiber and ceramic matrix, material requirements include: high melting points, high modulus, low density, freedom from destructive phase transformations, low volatility, oxidative stability, and creep resistance. For structural applications at high temperatures, environmental stability and creep resistance are the dominant factors in determining the usefulness of ceramic materials. In general, monolithic poly-crystalline oxide ceramics lose strength above 1200° C. Therefore, monolithic ceramics must be strengthened with high modulus fibers. The only materials that retain strength at these high temperatures, and under severe oxidative environments, are oxide fibers (e.g., sapphire) or silicon carbide (SiC) fiber. An additional concern is that the matrix and fiber materials must be chemically compatible (i.e., not react with each other). In fiber reinforced ceramic, the reinforcement is to enhance the fracture toughness. The fiber reinforcement prevents catastrophic brittle failure by providing mechanisms to dissipate energy during fracture. The operation of various toughening mechanisms, such as crack deflection, fiber pull out, and fiber bridging, depend to a large extent on the degree of chemical and/or mechanical bonding at the fiber-matrix interface. This chemical bonding is affected by the fiber surface chemistry and chemical reactivity between the fiber and matrix. The mechanical bonding is primarily controlled by the fiber surface morphology and the fiber/matrix thermal expansion match. In general, composites with strong interfacial bonding exhibit brittle behavior, characterized by high strength and low fracture toughness. If the interfacial interaction is weak then a composite will fail by catastrophic manner, and show high fracture toughness but low strength. It is therefore highly desirable to control the interfacial bond in order to optimize the overall mechanical behavior of the composite. The fiber-matrix interface must be sufficiently weak to allow debonding and sliding when a crack impinges upon it from the matrix; otherwise the crack passes through the fiber (or the fiber fails near the crack tip) and there is minimal or no toughening (Michalke and Hellmann, 1988). To control the strength of fiber coatings and the interaction between the coating and both the fiber and matrix, is extremely important to control the porosity of the coating materials.

In contrast, control of pore size, pore size distribution and porosity in ceramics is important for their applications in ceramic membranes and catalyst supports. Membrane-based technologies play a unique and increasingly important role in pollution prevention, resource recovery and waste treatment activities (Baker, 1991). Due in large part to cost considerations, polymeric membranes have dominated these environmental separations applications. However, the use of polymeric membranes in separations involving aggressive materials such as many solvents, acids, bases, and oxidants may be limited by the tolerance of these membranes to extreme conditions (Hsieh, 1988). Ceramic membranes are noted for their excellent mechanical strength and tolerance to solvents, pH, oxidant, and temperature extremes. In addition, the amphoteric properties of ceramic membrane surfaces result in a uniquely versatile membranes for water and waste water treatment. Membrane charge, selectivity, and permeation rate vary as a function of pH, ionic strength and other characteristics of the feed water solution chemistry, Baltus (1997) and Kim and Stevens (1997). Membrane characteristics as well as the properties of the contaminants can be manipulated through adjustments in the solution chemistry of the feed stream in one or more pretreatment steps (Anderson et al. 1988). Ceramic membranes are typically produced by slip casting a colloidal suspension on a porous ceramic support: Okubo, et al. (1990), Elaloui et al. (1997), Lin et al. (1991), Lao et al. (1994), Zaspalis et al. (1992). A schematic view of a typical membrane design is shown in FIG. 5. The individual membranes are mounted into a membrane module (see FIG. 6). Control of the colloidal suspension in the sol-gel process and limitations on the size of colloids that can be produced have constrained the range of membrane types that can be produced. In addition, a key obstacle to overcome in advancing the use of ceramic membranes for pollution prevention applications is cost. The sol-gel processes currently used to produce commercially available ceramic membranes is energy intensive and difficult to control. Considerable time and expense is invested in verifying membrane integrity and re-casting membranes to repair imperfections. Alternative approaches for manufacture of ceramic membranes include the anodic oxidization of aluminum metal membranes (Furneaux et al. 1989), pore size being controlled by the applied voltage used in the anodic oxidation. However, strong dielectric solutions of various acids must be employed, and ion beam or chemical etching is performed to produce a working filter. An ideal ceramic membrane must be highly selective, highly permeable, and highly durable. The membrane selectivity is primarily dependent upon the pore-size distribution: a narrow distribution contributes to a highly selective membrane. Membrane permeability is a function of global porosity, membrane thickness, connectivity, and pore-size distribution. Membrane durability is obtained by high homogeneity and high density; the latter entails a clear compromise with permeability. Mechanical integrity is enhanced in such application by slip-casting a relatively thin selective membrane onto a larger, durable membrane of poor selectivity but high permeability.

SUMMARY OF THE INVENTION

The present invention provides alumina and aluminum-oxide ceramic membranes filters of controlled pore size, pore size distribution and porosity, a method to produce such filters, and the use of these materials as ceramic membrane filters.

The inventive method is based on the use of carboxylate-alumoxanes that can be described by the general formula: $[Al(O)_x(OH)_y(O_2CR)_z]_n$ and/or $[Al(O)_x(OH)_y(O_2CR)_z(O_2CR')_{z'}]_n$ and/or $[Al(O)_x(OH)_y(O_2CR)_z(O_2CR')_{z'}(O_2CR'')_{z''}]_n$ etc. where $RCO_2^-$ (and $R'CO_2^-$ and $R''CO_2^-$) are mono-carboxylates and R (and R' and R'') are the same or different and are from the group of a hydrogen and/or an organic group. The organic group is preferably an alkyl, alkenyl, aromatic, haloalkyl, haloalkenyl, haloaromatic groups or alkyl, alkenyl, aromatic ether groups or an organic group containing a hetero-atom including, oxygen, nitrogen, sulfur, phosphorous. These components may be prepared by the methods described in Landry et al. (1995), Apblett et al. (1992), Kareiva et al. (1996), and the preferred method of Callender et al. (1997). The composition of the carboxylate-alumoxane varies depending on the starting materials employed and the details of the synthetic method employed by Callender et al. (1997). Thermolysis of the carboxylate-alumoxanes results in alumina being formed. In accordance with the present invention, the size and distribution of pores within the alumina-oxide ceramic is dependent on the identity of the carboxylate substituents. In particular, the formation of intra- versus inter-granular porosity is dependent on the identity of the carboxylate substituents. Similarly, size and distribution of the pores is controlled by the choice of the organic substituents.

The invention also provides methods for the manufacture of ceramic coatings on ceramic and carbon fibers for composite applications and ceramic membranes with nanometer sized pores. Dipping a ceramic or carbon fiber into a solution of the carboxylate-alumoxane in accordance with the invention, drying and firing provides a uniform coating of the aluminum-oxide based ceramic on the surface of the fiber. The pore size, pore size distribution and porosity, and hence the strength, permeability and surface adhesion of the ceramic coating is controlled by the choice of the substituent on the carboxylate-alumoxane. Thermolysis of self-supporting spun layers of the carboxylate-alumoxanes results in disks of alumina with controlled pore size, pore size distribution and porosity. Also, a porous substrate may be dipped or coated with a solution of the carboxylate-alumoxane, followed by thermolysis to produce a composite membrane.

Accordingly, in a preferred embodiment, the present invention includes a ceramic body of controlled pore size and distribution comprising the thermolysis product of a carboxylate-alumoxane represented by the formula $[Al(O)_x(OH)_y(O_2CR)_z]_n$, wherein x is from 0 to 1.5, y is from 0 to 3, z is from 0 to 3, n is greater than 6, and R is hydrogen or an organic group.

In another preferred embodiment the invention includes a ceramic body of controlled pore size and distribution comprising the thermolysis products of a carboxylate-alumoxane represented by the formula $[Al(O)_x(OH)_y(O_2CR)_z(O_2CR')_{z'}]$, wherein x is from 0 to 1.5, y is from 0 to 3, z is from 0 to 3, z' is from 0 to 3, n is greater than 6, wherein each R, which may be the same or different, is hydrogen or an organic group, and wherein each R', which may be the same or different, is hydrogen or an organic group.

In yet another preferred embodiment the invention includes a porous ceramic body comprising the thermolysis product of the reaction product of a carboxylic acid with boehmite, represented by the formula $[Al(O)_x(OH)_y(O_2CR)_z]_n$, wherein the porosity and pore size distribution of the ceramic body is controlled by the selection of the number, z, of carboxylate groups.

In yet another preferred embodiment the invention includes a porous ceramic composite comprising a nano-particle comprising the thermolysis product of the reaction product of a substituted carboxylate-alumoxane with an aluminum oxide wherein the pore size and pore distribution of the ceramic composite are controlled by the substituent on the carboxylate-alumoxane.

In yet another preferred embodiment the invention includes a porous ceramic filter of controlled pore size and pore size distribution comprising a nano-particle comprising the thermolysis product of the reaction product of a substituted carboxylate-alumoxane with an aluminum oxide wherein the pore size and pore distribution of the ceramic composite are controlled by the substituent on the carboxylate-alumoxane.

In yet another preferred embodiment the invention includes a fiber reinforced material comprising a fiber, and a fiber coating comprising a porous ceramic composite of a nano-particle comprising the thermolysis product of the reaction product of a substituted carboxylate-alumoxane with an aluminum oxide wherein the pore size and pore distribution of the ceramic composite are controlled by the substituent on the carboxylate-alumoxane.

In yet another preferred embodiment the invention includes a method of controlling the porosity and pore size distribution of ceramic bodies comprising: reacting boehmite with a carboxylic acid to produce carboxylate-alumoxane nanoparticles; drying the carboxylate-alumoxane nano-particles; re-dissolving the carboxylate-alumoxane nano-particles in a solvent; drying the nano-particles; and firing the dried nano-particles at a temperature greater than 300° C.

BRIEF DESCRIPTION OF THE DRAWINGS

For a more detailed description of the preferred embodiments of the present invention, reference will not be made to the accompanying drawings, wherein.

DETAILED DESCRIPTION OF THE INVENTION

This invention discloses the use of carboxylate-alumoxanes ($[Al(O)_x(OH)_y(O_2CR)_z]_n$) and/or aluminum-oxide nano-particles to prepare alumina and aluminum oxide-based ceramic bodies, coatings and membranes with chemically controlled pore sizes, pore size distributions and porosities. Such ceramics with chemically controlled porosities may be used as membrane materials with controlled pore size distributions or as coatings on fibers.

The carboxylato-alumoxanes are precursors to alumina and aluminum oxides (Table 1) and are prepared by the reaction of boehmite or pseudoboehmite with carboxylic acids in a suitable solvent (Tables 2, 3, 4, and 5). The boehmite (or pseudoboehmite) source can be a commercial boehmite product such as Catapal (A, B, C, D, or FI, Vista Chemical Company) or boehmite prepared by the precipitation of aluminum nitrate with ammonium hydroxide and then hydrothermally treated at 200° C. for 24 hours or boehmite prepared by the hydrolysis of aluminum trialkoxides followed by hydrothermal treatment at 200° C. The carboxylic acid can be any monocarboxylic acid. The carboxylic acid can be aromatic, aliphatic, and can contain hetero-atom functional groups such as hydroxyls, amines, mercaptans, phosphines, etc. Unlike sol-gel synthesis the carboxylate alumoxanes are stable both in solution and the solid state. In addition, whereas the choice of solvents in sol-gel synthesis is limited, the solubility of the carboxylate alumoxanes is dependent only on the identity of the carboxylic acid residue, which is almost unrestricted according to the present invention. The solubility of the alumoxanes is therefore readily controlled so as to make them compatible with any co-reactants. While these advantages are significant, the alumoxanes have yet further benefits with respect to large scale production of ternary and quaternary ceramics. The most dramatic of these is the simplicity of the alumoxane methodology. The alumoxane route is simple, and can be halted and/or modified at any stage without significant effects on the products. A careful control of pH, the use of additives to inhibit precipitation, and slow concentration steps are not required, thus making the alumoxane route easier and quicker than prior art techniques. Another benefit with respect to large scale processing is the relatively low cost of the alumoxane precursors.

Figure 17:
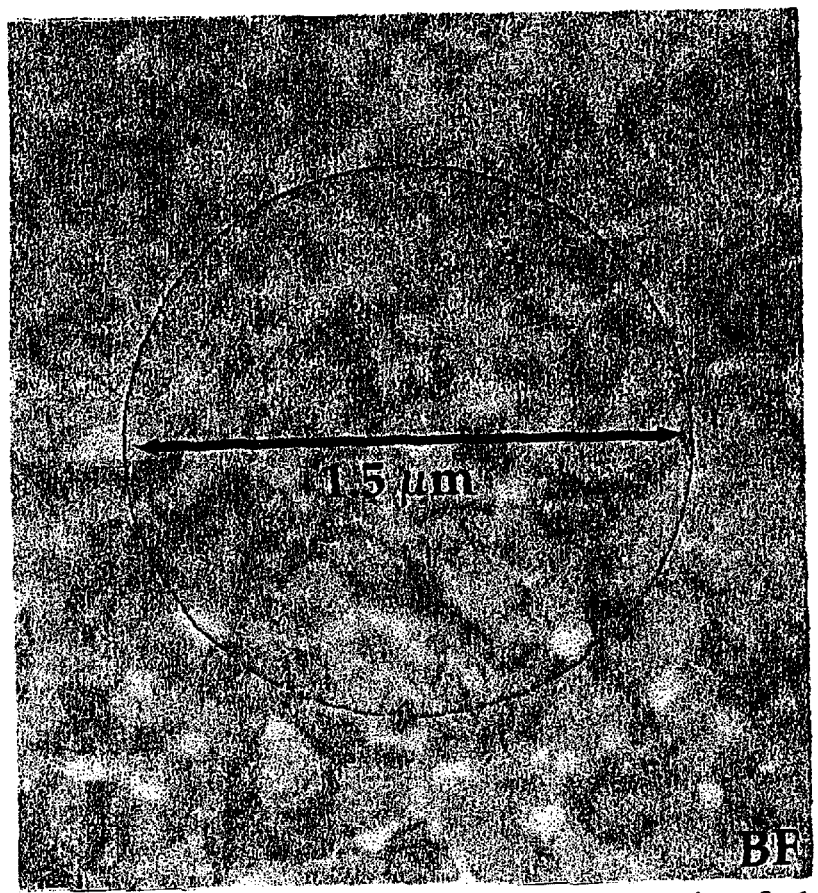
FIG. 17 is a Selected Area Diffraction (SAD) image of fired acetate-alumoxane ceramic material.
Figure 17:
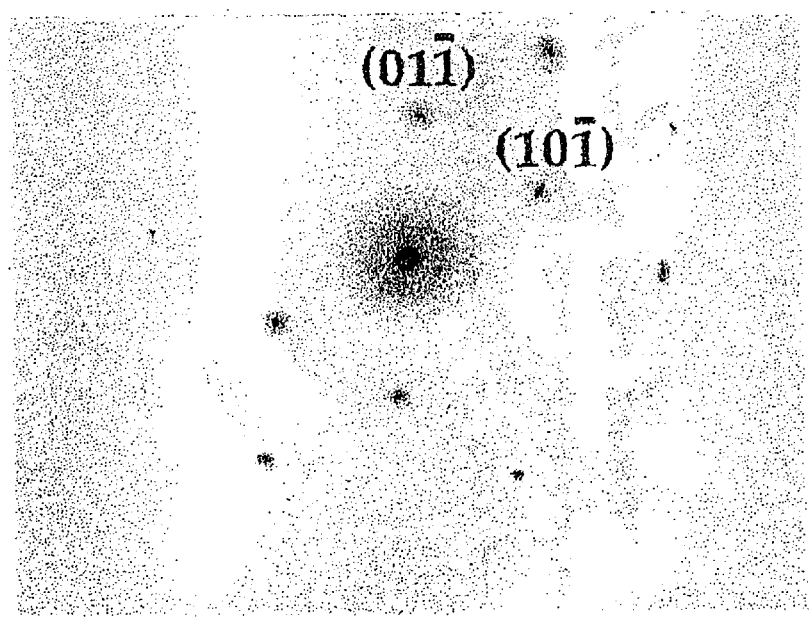

Thermogravimetric/differential thermal analysis (TG/DTA) of the carboxylate-alumoxanes generally indicates two major decomposition regions. The relative mass loss and temperatures at which these regions occur is dependent on the identity of the carboxylic acid. The volatiles are predominantly the carboxylic acid and water, with traces of the ketone, i.e., acetone is liberated from the acetate-alumoxane (A-alumoxane or A-A). As may be expected, the ceramic yield is conditional on the identity of the carboxylic acid: greatest for A-A (ca. 75%), lowest for methoxy (ethoxyethoxy)acetate-alumoxane (MEEA-A) (ca. 20%). All of the carboxylate-alumoxanes decompose above 180° C. to give amorphous alumina. Firing above 900° C. ($\geq 3$ h.) results in the formation of better ordered mixed phase $\gamma$-$Al_2O_3$ (JCPDS # 2963) and $\gamma$-$Al_2O_3$ (Corundum, JCPDS # 42-1468), as would be expected based on the known transformation sequence of alumina. All of the carboxylate alumoxanes are converted to $\alpha$-alumina above 1000° C. with firing times $\geq 4$ hours. It is interesting to note that the A-alumoxane is highly reactive and forms crystalline $\alpha$-$Al_2O_3$ at temperatures below 850° C. (Table 1). The lower temperature of this phase formation and failure to observe $\gamma$-$Al_2O_3$ from A-alumoxane is consistent with the very small initial pore size (large surface area) and rapid sintering rates. The conversion of acetate-alumoxane (A-A) to $\alpha$-alumina at lower than the expected temperatures (FIG. 17), and the apparent lack of the $\gamma$-alumina phase being formed, is useful since the conversion of $\gamma$-alumina to $\alpha$-alumina is associated with a change in density and a decrease in volume. This decrease in volume is detrimental to the formation of stable ceramic composites.

All the un-doped carboxylate-alumoxanes in the examples reported below produced uniform, translucent, fired bodies with differences in microscopic pore size, pore size distribution and porosity, but with similarities in macroscopic density. Both MEEA- and MEA-(methoxy (ethoxyethoxy)acetate)—alumoxane produce either high porosity translucent solid "foam" or slightly translucent bodies consistent with a smaller porosity/higher microscopic density.

Figure 13:
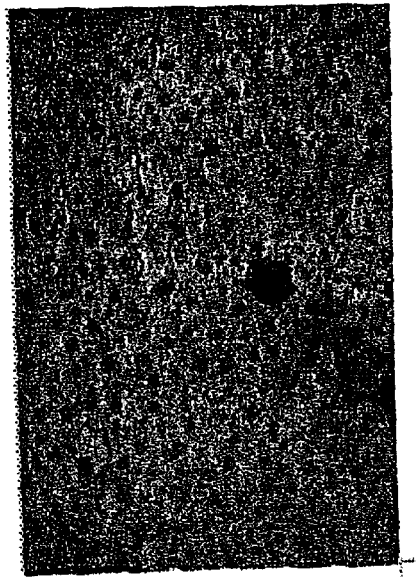
FIG. 13 shows Transmission Electron Microscopy (TEM) images of $\alpha$-$Al_2O_3$ from carboxylate-alumoxanes.
Figure 13:
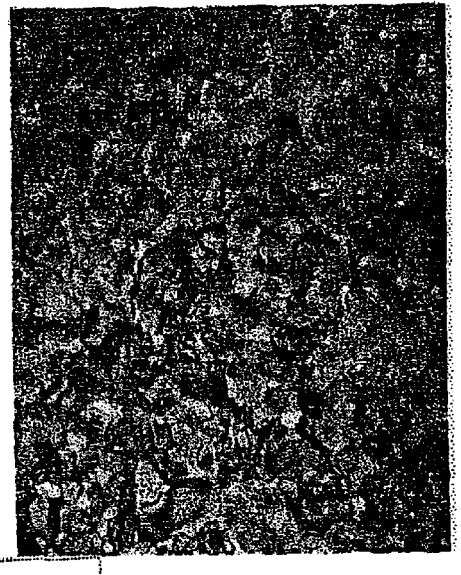
Figure 13:
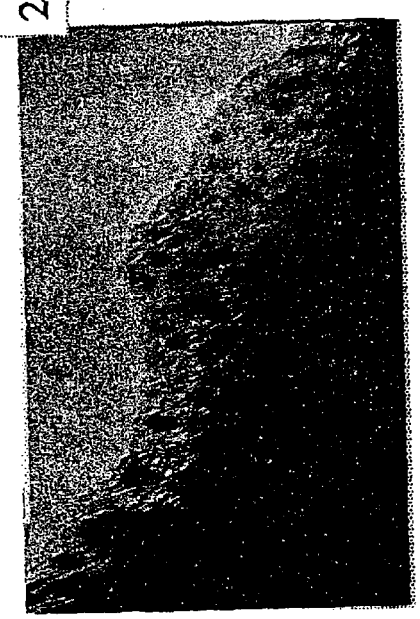
Figure 14:
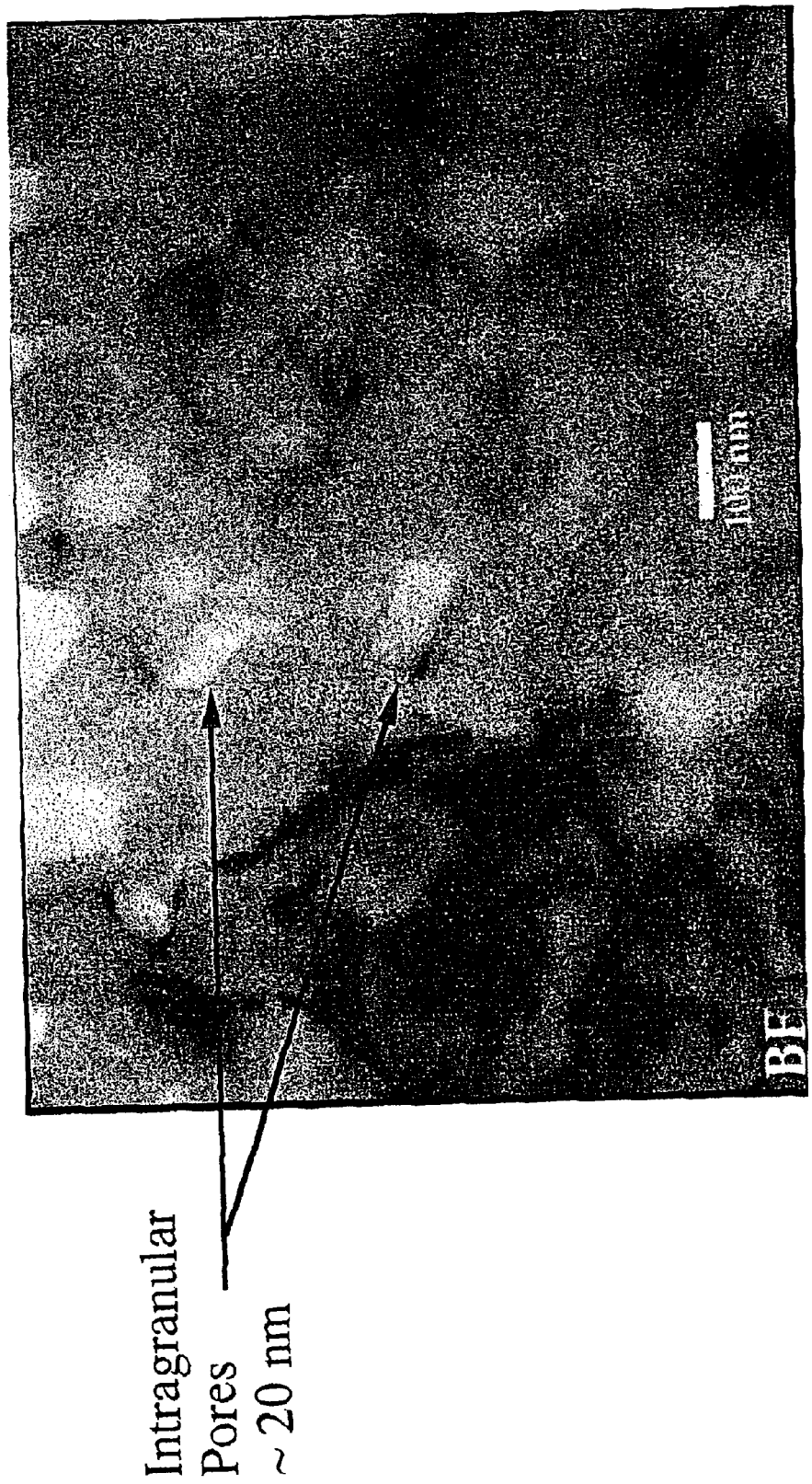
FIG. 14 is a TEM image of $Al_2O_3$ ceramic material from fired acetate-alumoxane.
Figure 25:
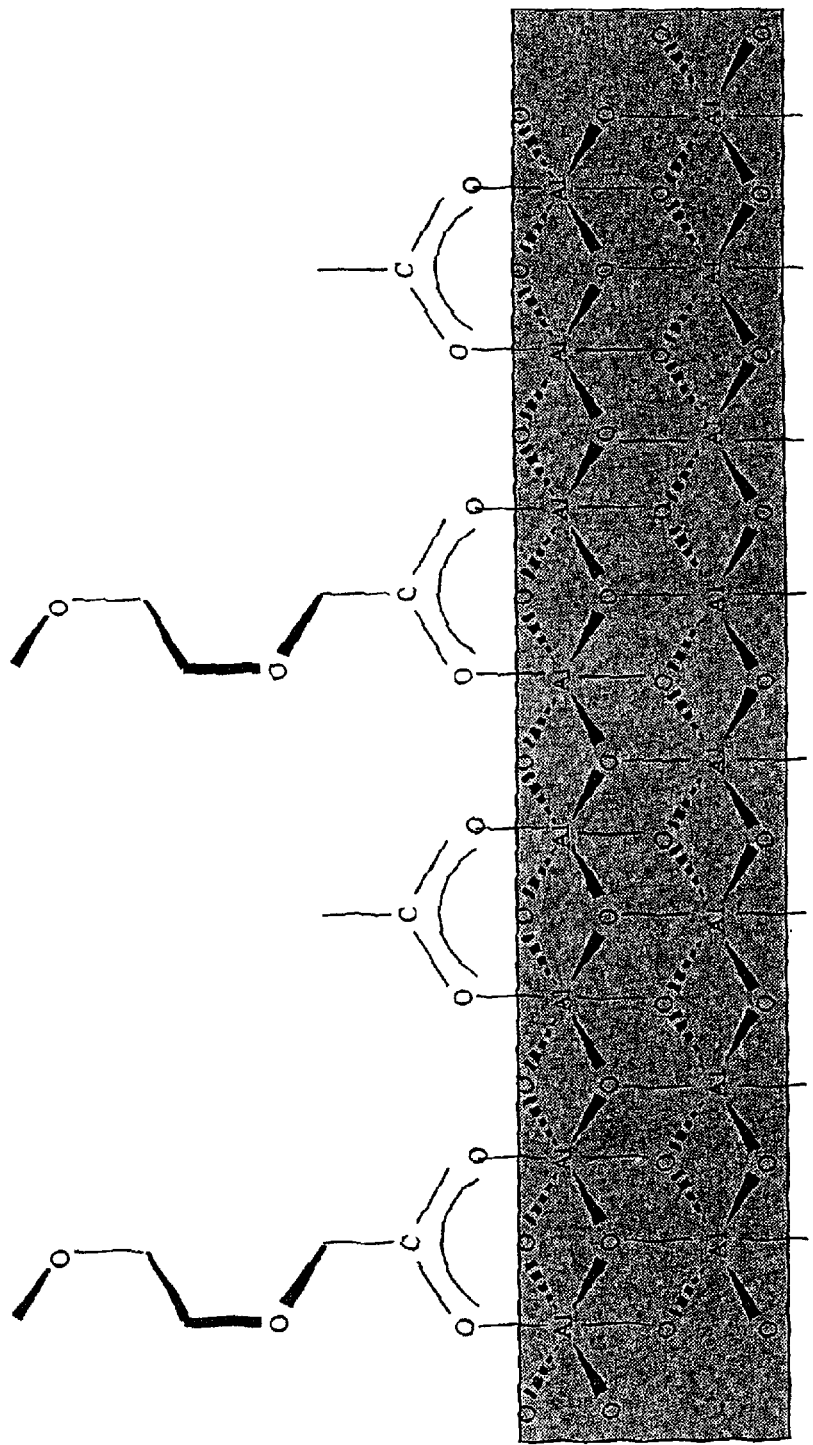
FIG. 25 is a schematic representation of a mixed-ligand alumoxane.

The $\alpha$-$Al_2O_3$ formed from MEEA-, MEA-, and MA-(methoxyacetate) alumoxanes exists as a nanocrystalline matrix with a very high volume of large interconnecting pores, as determined by TEM studies (FIG. 13). In contrast, analysis of the $\alpha$-$Al_2O_3$ formed from A-alumoxane revealed very fine uniform intra-granular porosity (FIG. 14), in which the crystallite size is relatively large (ca. 2 $\mu$m). The difference in pore size and structure is more consistent with the chemical identity of the substituents than the physical processing conditions, i.e., a higher organic volume outgassed produces larger pores. Using the alumoxane series, it is possible to engineer-pore size continuously between these extremes by using mixed ligand solutions (FIG. 25).

Figure 6:
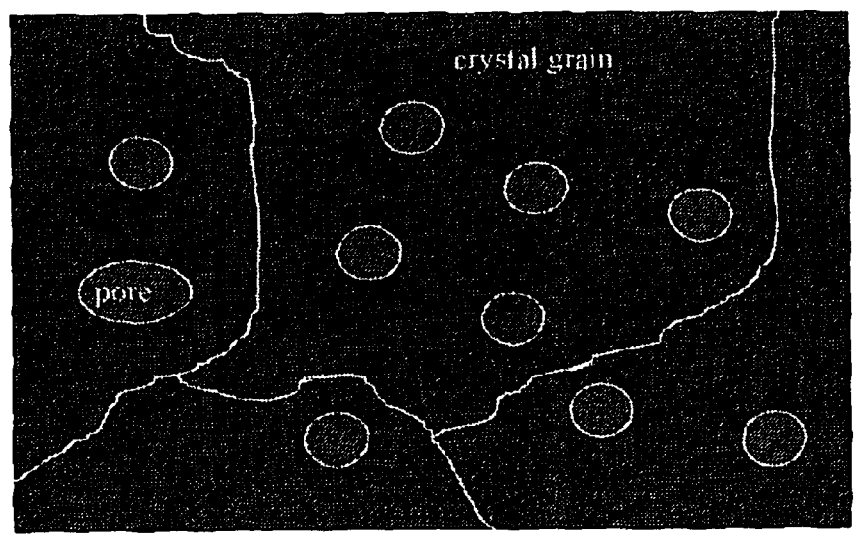
FIG. 6 is a another schematic representation of intergranular porosity.
Figure 7:
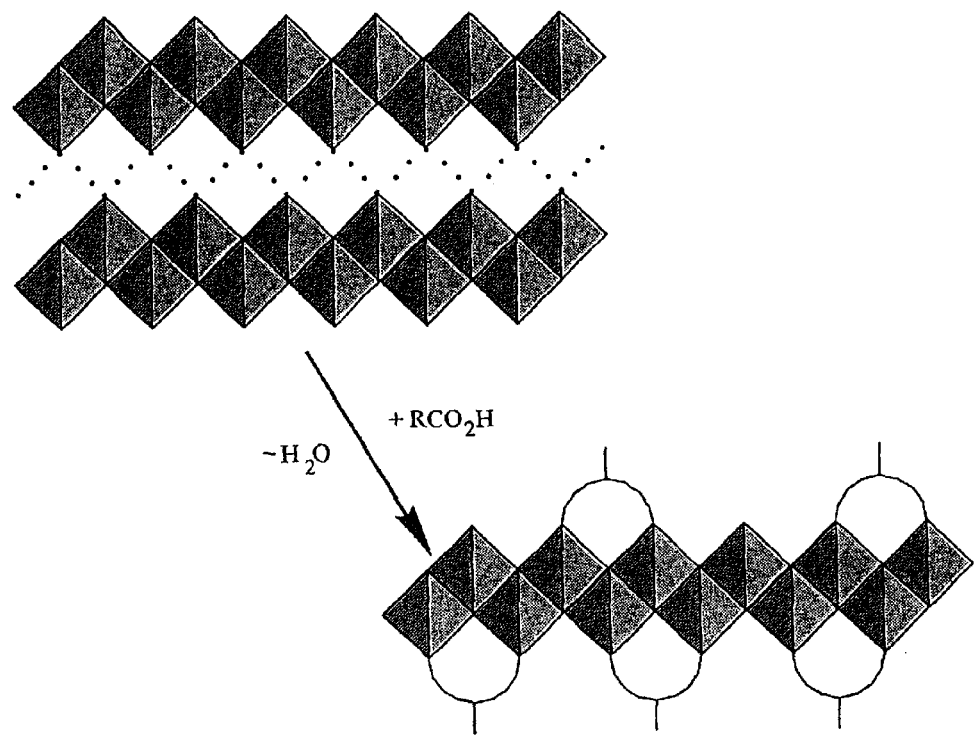
FIG. 7 is a pictorial representation of the reaction of boehmite with carboxylic acids.
Figure 8:
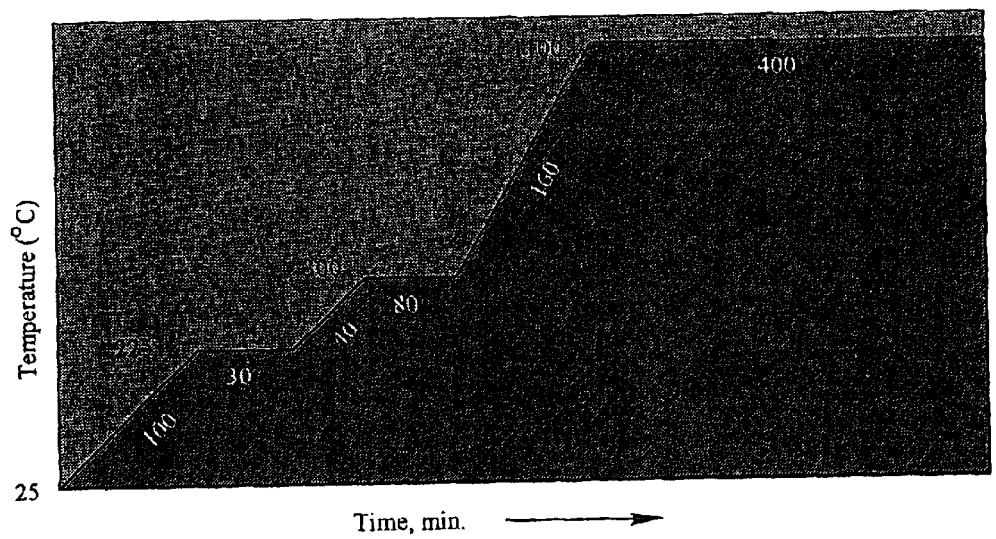
FIG. 8 illustrates thermal processing of alumoxanes by a controlled heating series.
Figure 9:
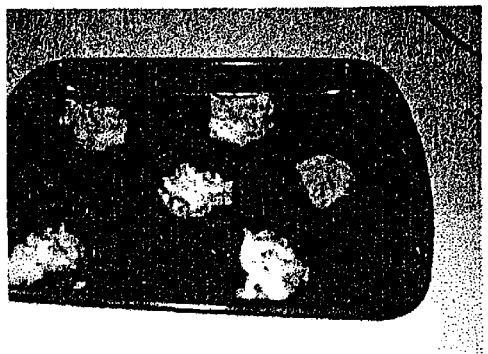
FIG. 9 illustrates a model for inter-granular versus intra-granular porosity.
Figure 9:
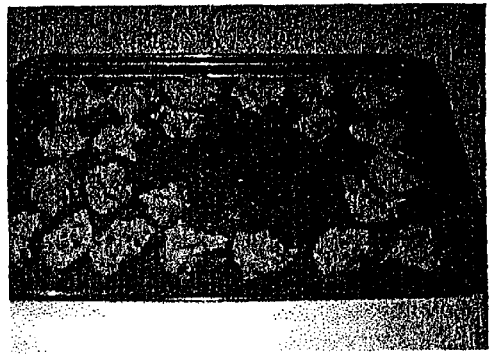
Figure 9:
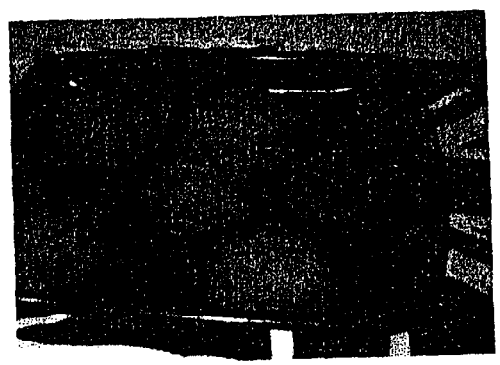
Figure 9:
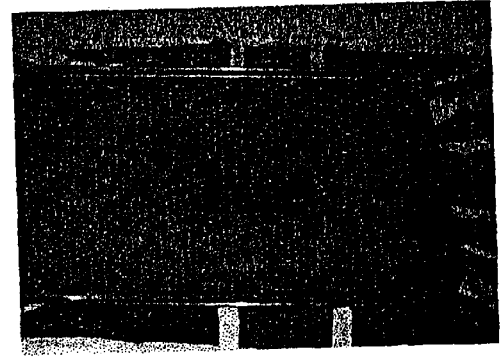
Figures 10, 11:
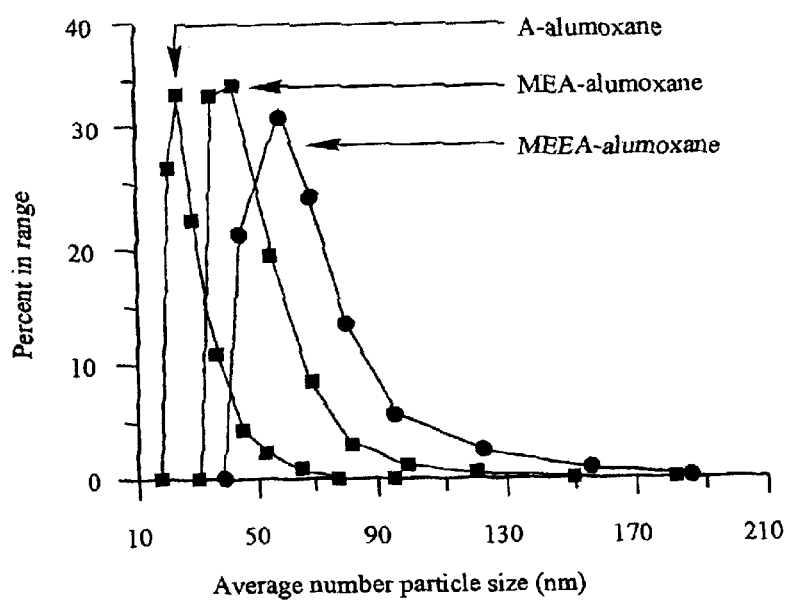
FIG. 10 illustrates particle size determination by Photon Correlation Spectroscopy (PCS)
FIG. 11 is a graphical representation of particle size determination of carboxylate-alumoxanes in water by PCS.
Figure 12:
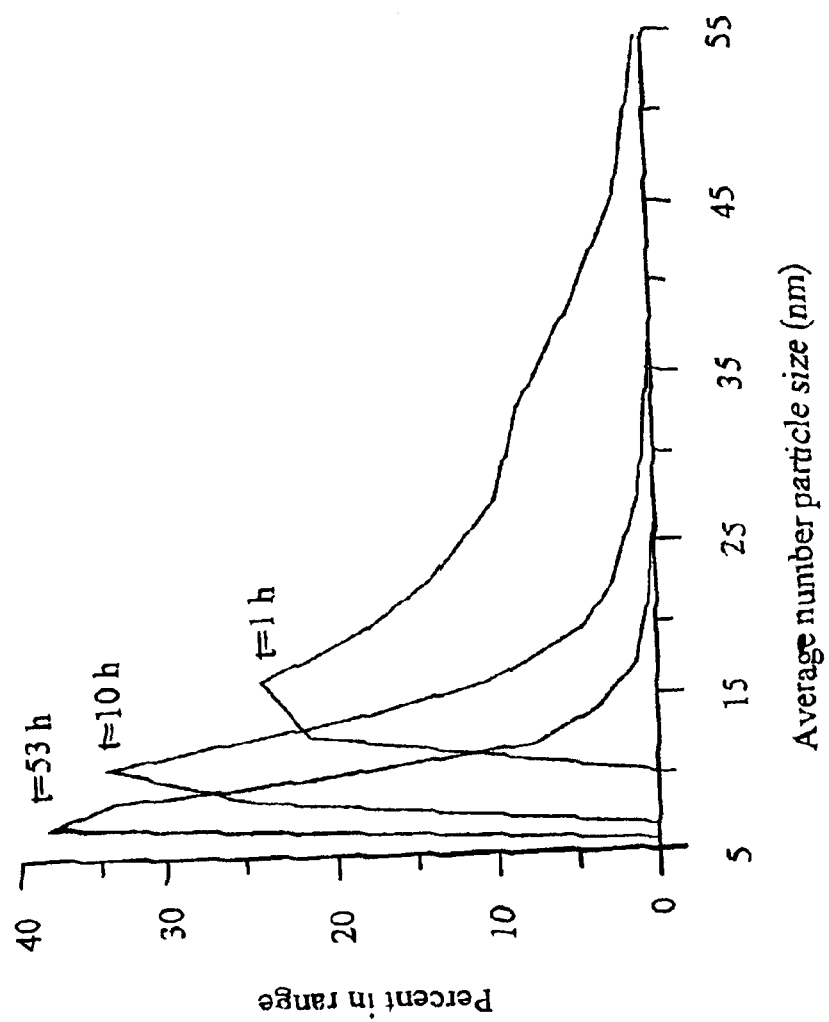
FIG. 12 is a graphical representation of particle size determination of various aliquots removed from the reaction of MEA-H with boehmite by PCS.
Figure 15:
FIG. 15 shows TEM negative images of fired acetate-alumoxane illustrating intra-granular pores.
Figure 15:
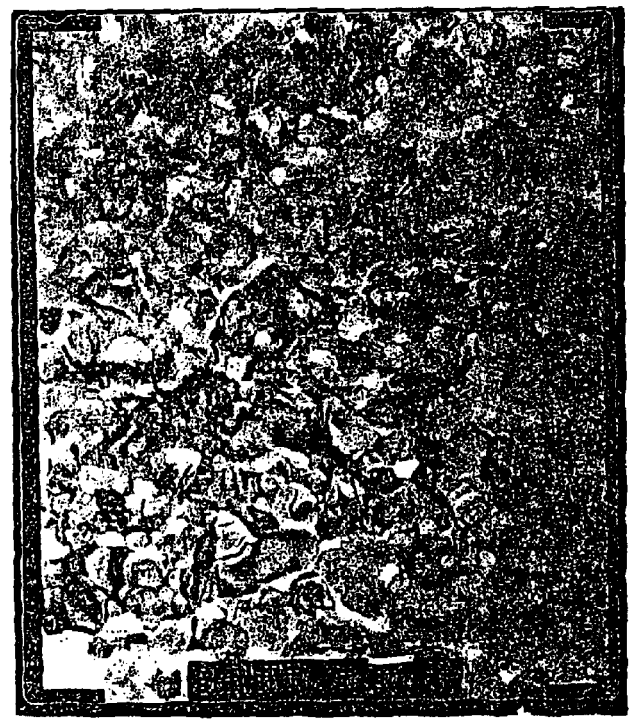
Figure 16:
FIG. 16 shows images of fired acetate-alumoxane illustrating intragranular porosity.
Figure 16:
Figure 16:
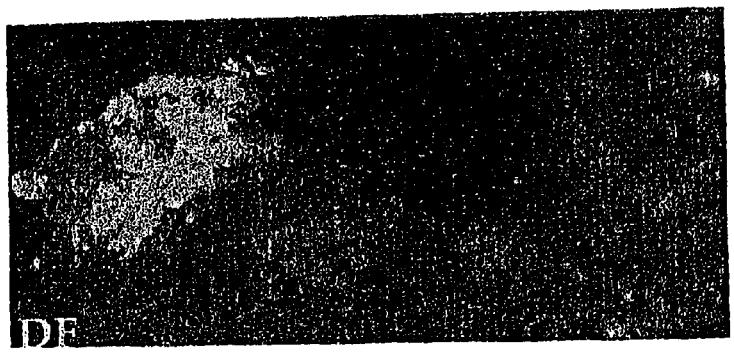

Further study of the acetate-alumoxane (A-alumoxane) indicates that instead of the usual inter-granular porosity (FIGS. 15 and 16) the pores are intra-granular, that is, they are within the individual crystal grains (FIG. 6). This novelty of chemical control over the formation of intra-granular (rather than inter-granular) porosity has the aforementioned benefit of increased fracture toughness. Intra-granular pores instead of inter-granular therefore allow increased fracture toughness and less opportunity for pore/boundary/crack interactions to occur. The formation of intra-granular pores for the A-alumoxane is thought to be due to the nano-particulate nature of the acetate-alumoxane and the small length of the organic substituent (FIG. 9) Table 2. Other carboxylate-alumoxanes can produce intra-granular porosity if the nano-particle size is less than 50 nm.

Figure 1:
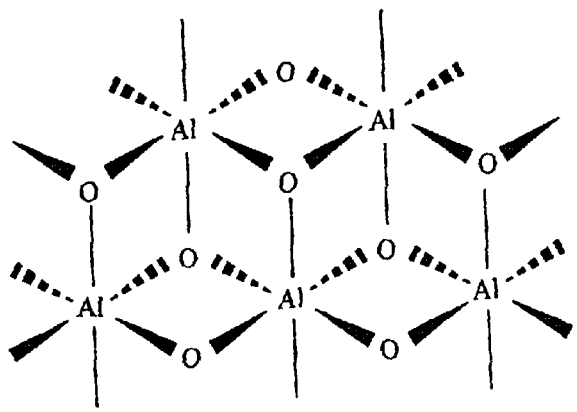
FIG. 1 is a schematic representation of the core of an alumoxane sol-gel material.
Figure 2:
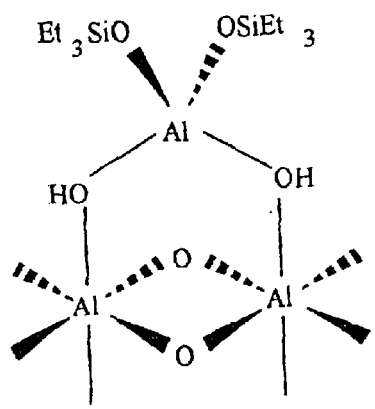
FIG. 2 is a schematic representation of the periphery of a typical siloxide-alumoxane.
Figure 3:
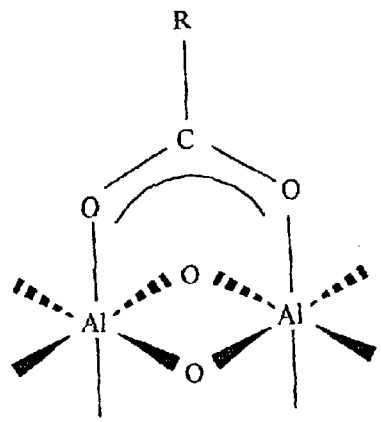
FIG. 3 is a schematic representation of the periphery of a carboxylate-alumoxane.
Figure 4:
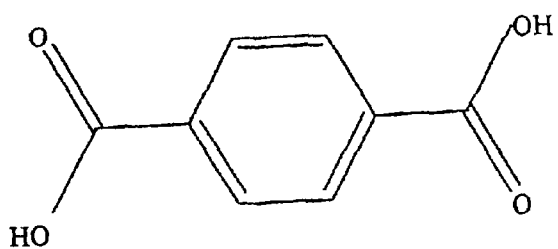
FIG. 4 is a schematic representation of a typical spacer ligand.
Figure 5:
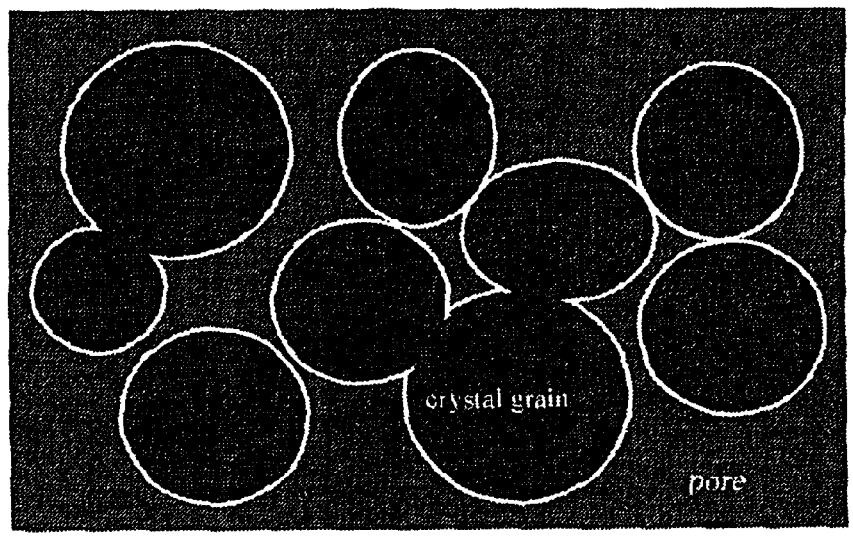
FIG. 5 is schematic representation of intergranular porosity.

Control of pore size, pore size distribution and porosity, and hence density, through chemical means is an important departure from traditional ceramic processing in which physical methods only are applied. The porosity of the resulting alumina is dependent on the length of the carboxylate side chain. That is, the pore sizes for carboxylate-alumoxanes with $CH_3$ substituents is different from those with $C_{5H11}$ substituents. Another approach to controlling pore size, pore size distribution and porosity described herein is the use of spacer ligands. The alumoxane can be cross-linked after fabrication of the membrane with di-acids (FIG. 4). Upon pyrolysis, it then inhibits the collapse of the ceramic.

Figure 26:
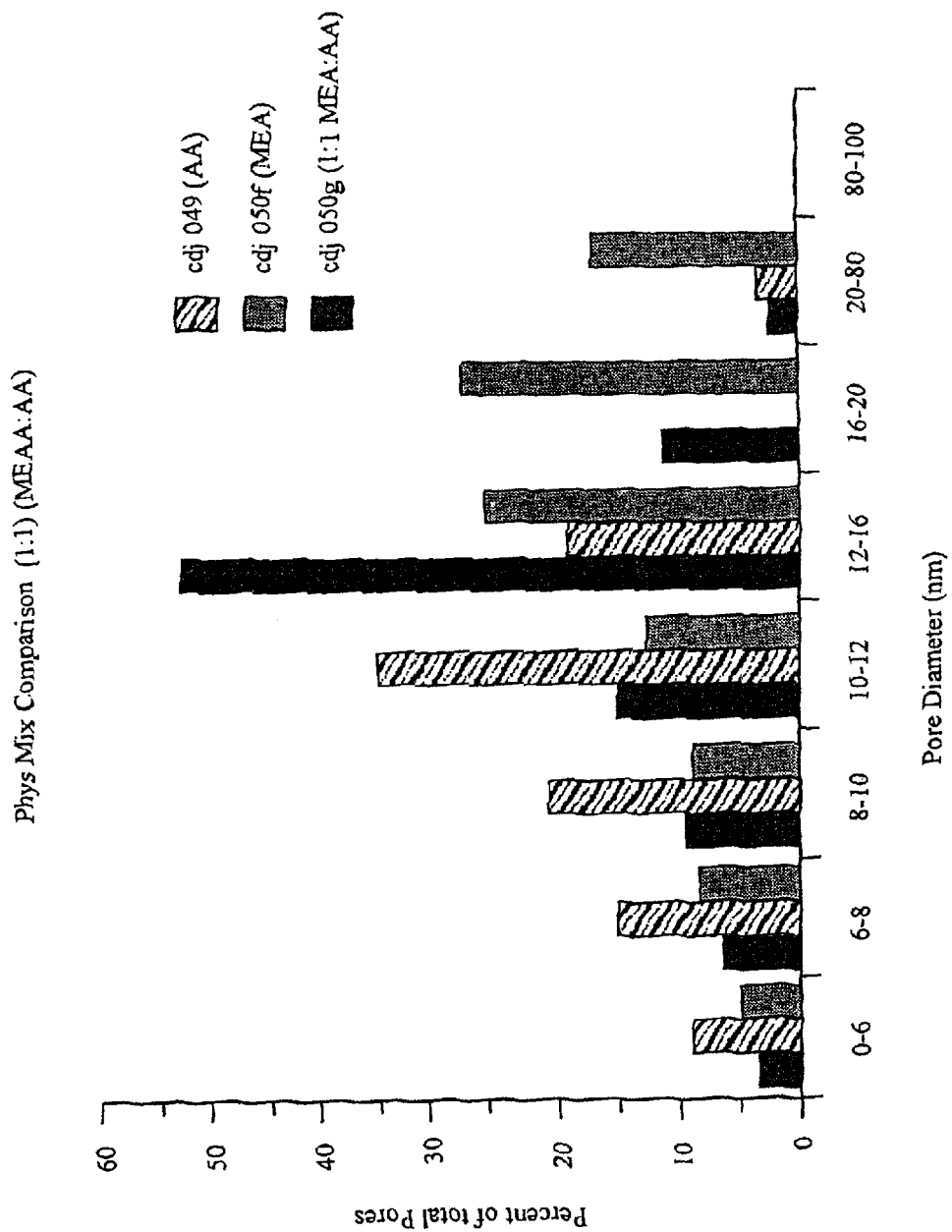
FIG. 26 is a bar chart comparing the pore size distributions of two carboxylate alumoxanes and a physical mixture of two carboxylate alumoxanes.
Figure 27:
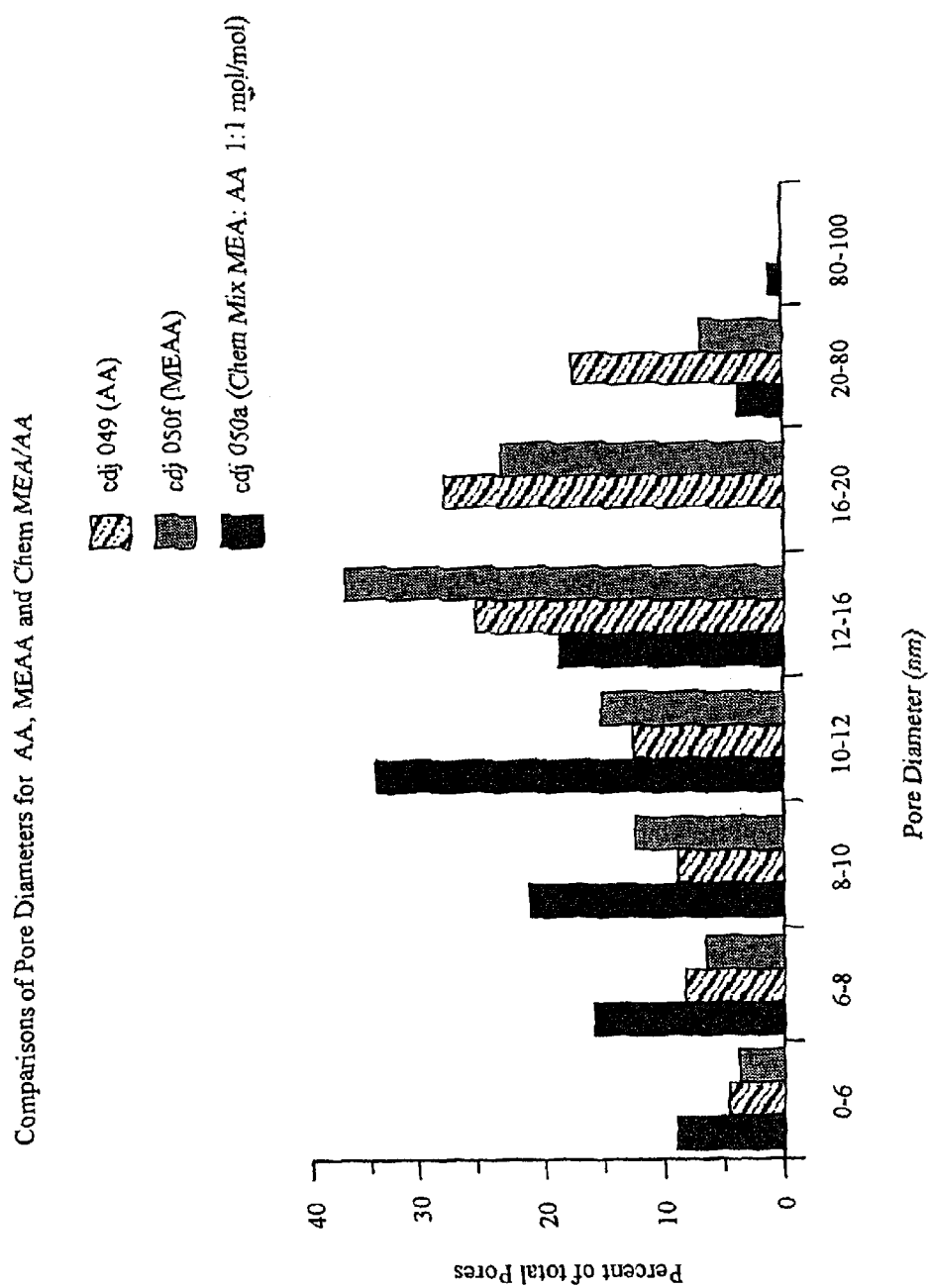
FIG. 27 is a bar chart comparing the pore size distributions of two carboxylate alumoxanes and a chemical mixture of two carboxylate alumoxanes.

Instead of using a single carboxylate-alumoxane, a physical mixture of more than one carboxylate-alumoxane may be produced and fired to alumina (Tables 4, 5, 6 and 7). The porosity (average pore size and pore size distribution) is dependent on the relative amounts of each carboxylate-alumoxane (Table 8). In general, the porosity is a mixture of the values of each individual carboxylate-alumoxane (FIGS. 26 and 27). Mixed carboxylate-alumoxanes may be synthesized in which more than one type of carboxylate group is bonded to each of the alumoxane nano-particles. The resulting porosity is different than the individual materials, and is dependent on the relative concentration of each carboxylate used (Table 8). The relative intra- to inter-granular porosity can be controlled by the choice of carboxylate group and/or mixtures or carboxylate groups.

Figure 18:
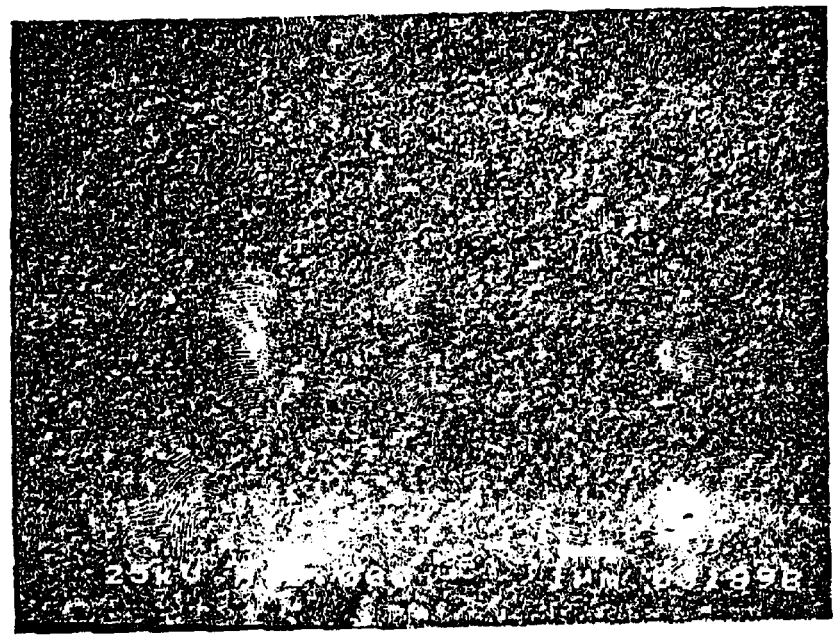
FIG. 18 shows surface images of mixed carboxylate-alumoxanes.
Figure 18:
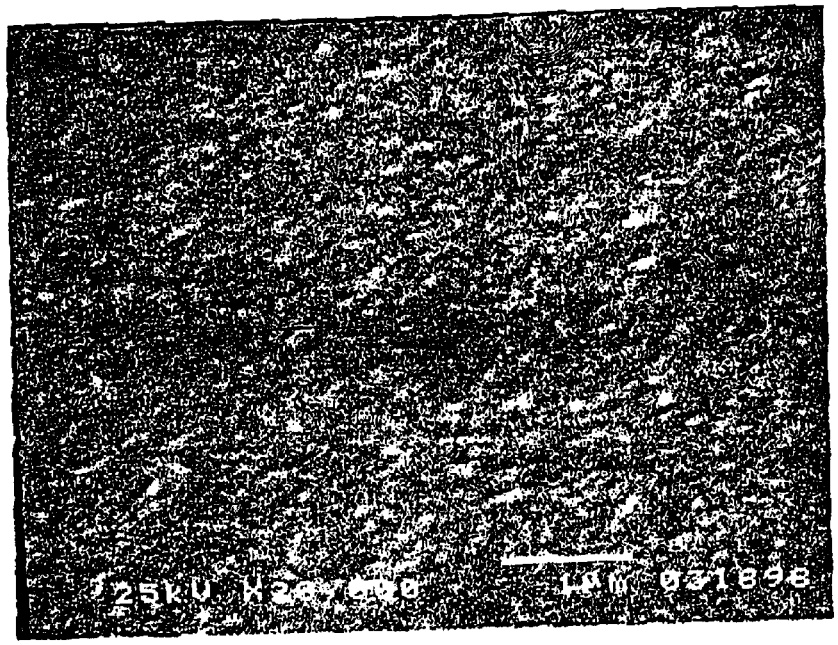
Figure 19:
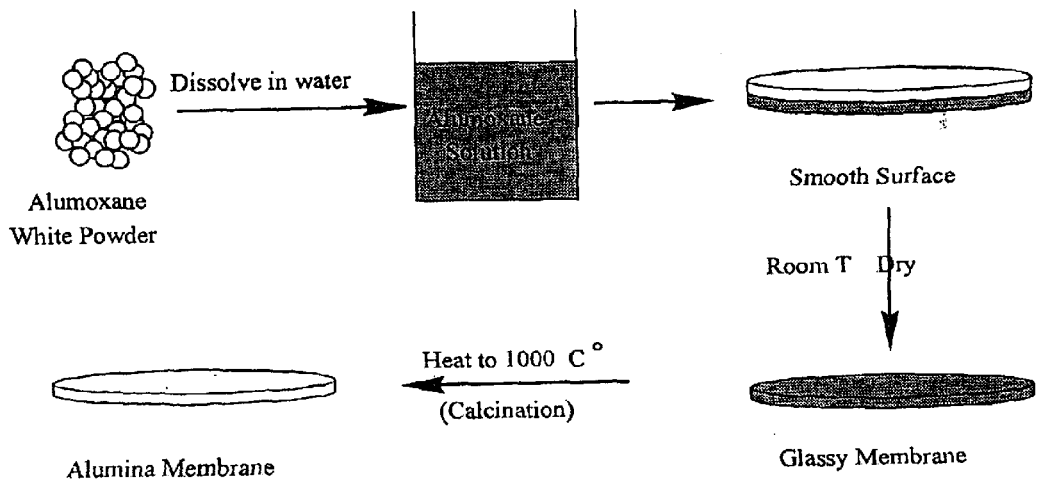
FIG. 19 is a schematic representation of the method of formation of a membrane.
Figure 20:
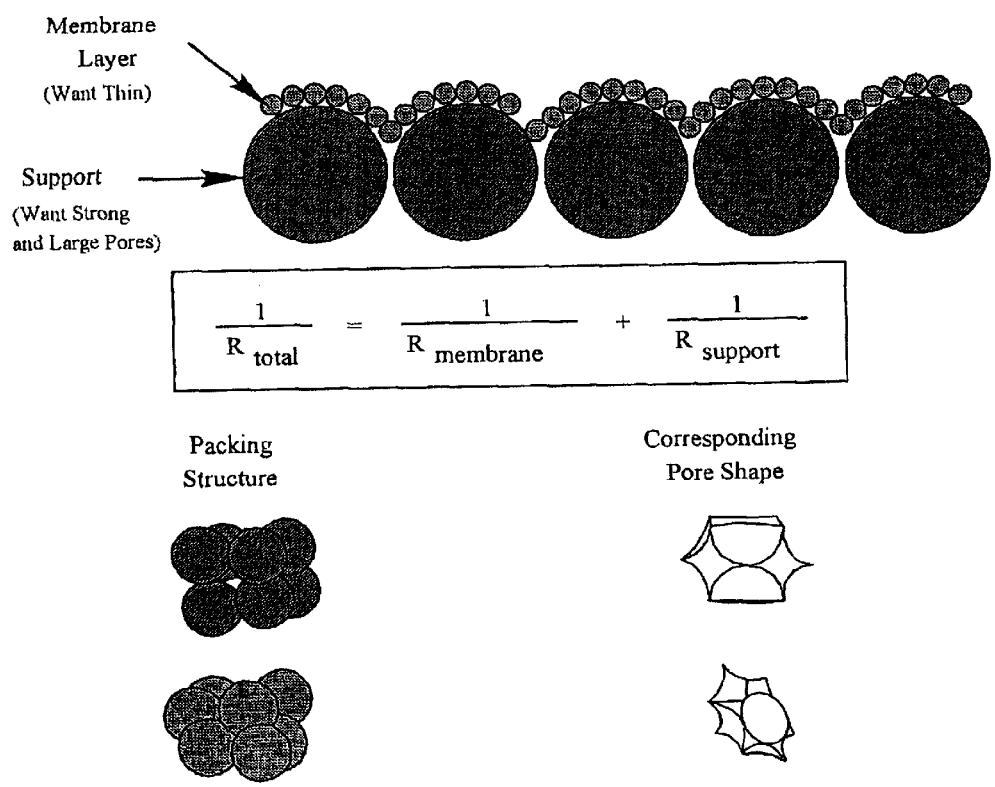
FIG. 20 is a schematic representation of the structure of a filter-supported membrane.
Figure 21:
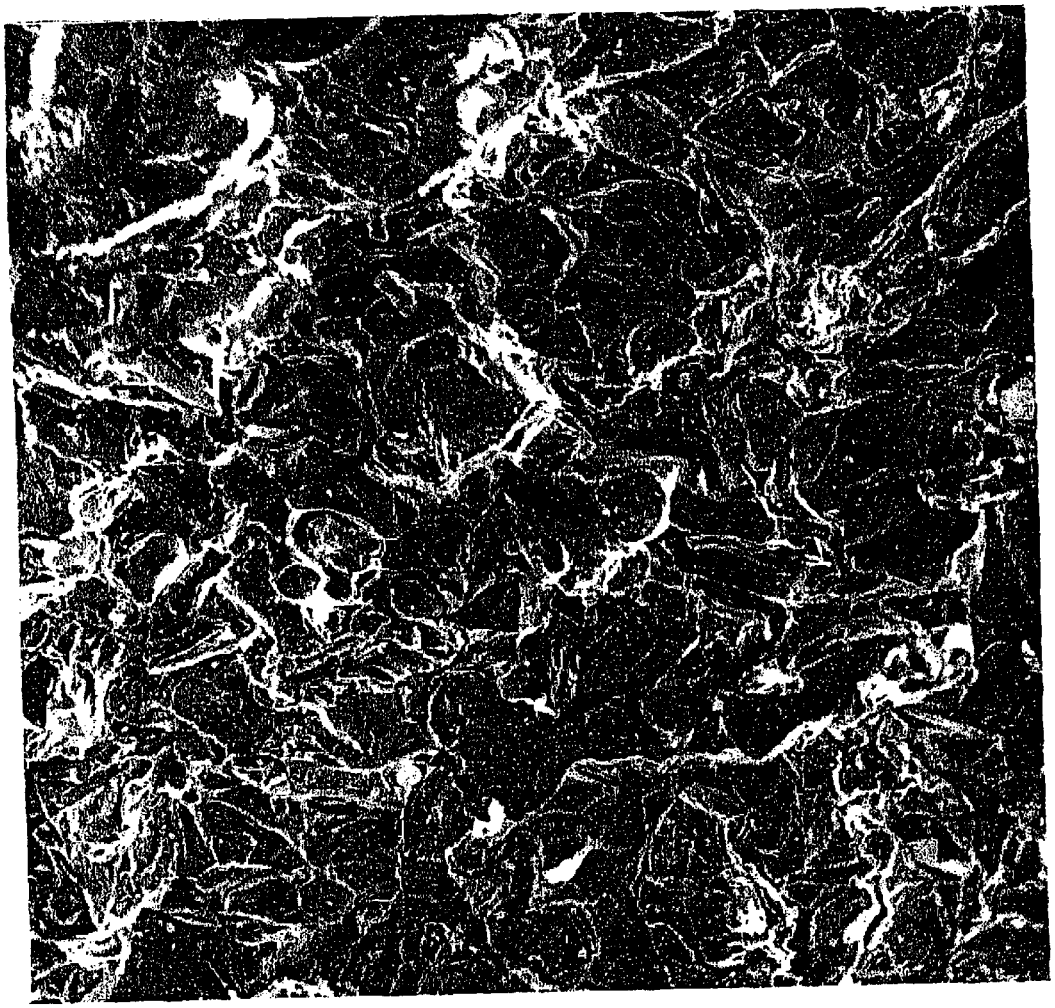
FIG. 21 is a SEM image of a coated frit.

Solutions of the carboxylate-alumoxanes may be evaporated to leave a thin membrane which is glass-like (FIG. 19). The resulting glassy membrane can then be fired to produce a ceramic membrane in which the porosity is controlled by the choice of the carboxylate group and/or ratio of physically and/or chemical mixtures of two or more carboxylates (FIG. 18). As an alternative to a self-supporting ceramic membrane, a porous substrate such as a glass or ceramic filter frit may be spun coated, painted, or dip-coated with the carboxylate-alumoxane solution, FIG. 21 (Tables 9 and 10). After drying and firing the composite consists of a membrane supported on a coarse filter (FIG. 20). The support for the carboxylate-alumoxane derived ceramic membrane does not have to be flat but may be a ceramic tube or column. If doped carboxylate-alumoxanes are employed, then the resulting membrane will have the composition of the doped carboxylate-alumoxane. In order to ensure that uniform membranes are produced, physical mixtures of different carboxylate-alumoxanes can be used. The lowering of phase formation/crystal growth temperatures observed for the carboxylate-alumoxane in comparison to sol-gel methods, allows for smaller pores to be generated without being sintered out during thermal treatment.

Figure 22:
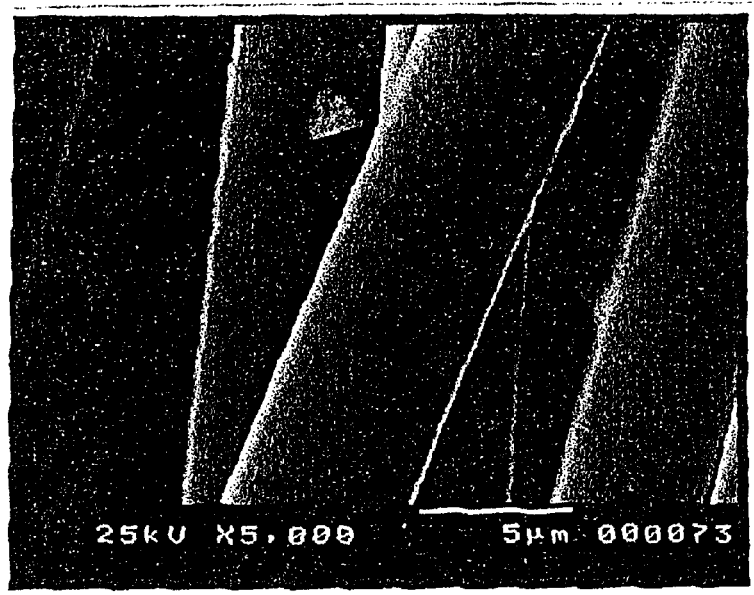
FIG. 22 shows micrographs of coated carbon fibers.
Figure 22:
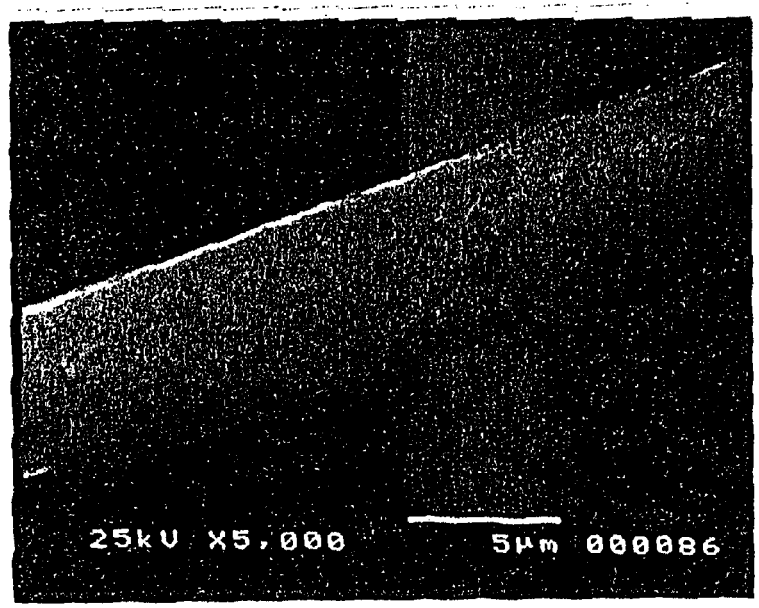
Figure 23:
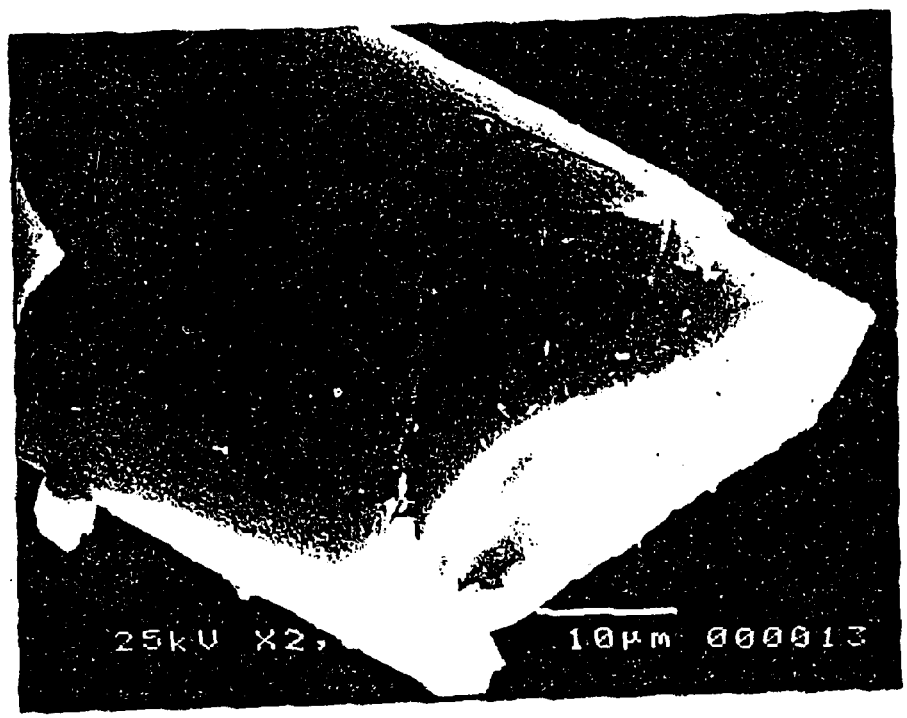
FIG. 23 shows a micrograph of a hibonite coated silicon carbide fiber.
Figure 24:
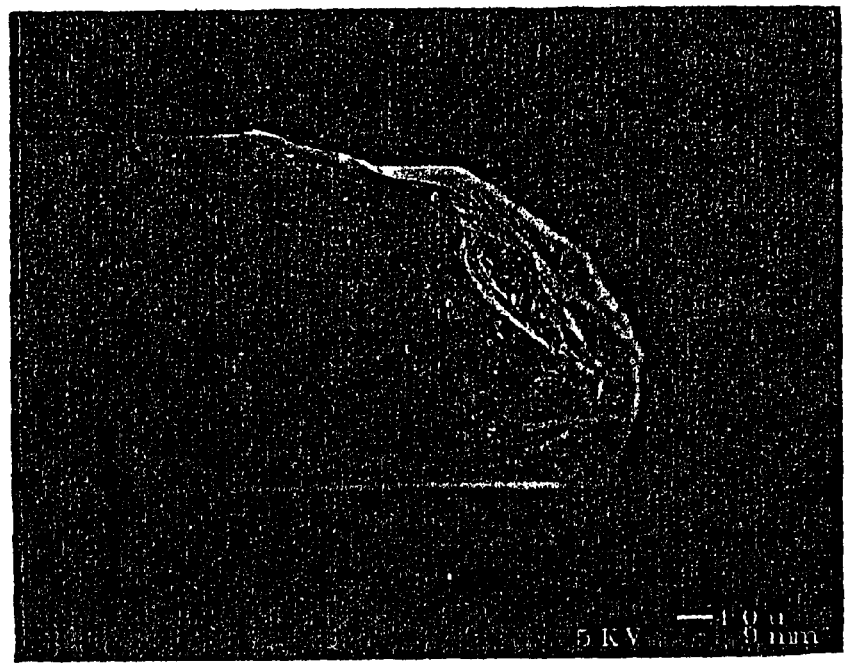
FIG. 24 shows micrograpls of coated and uncoated sapphire fibers.
Figure 24:
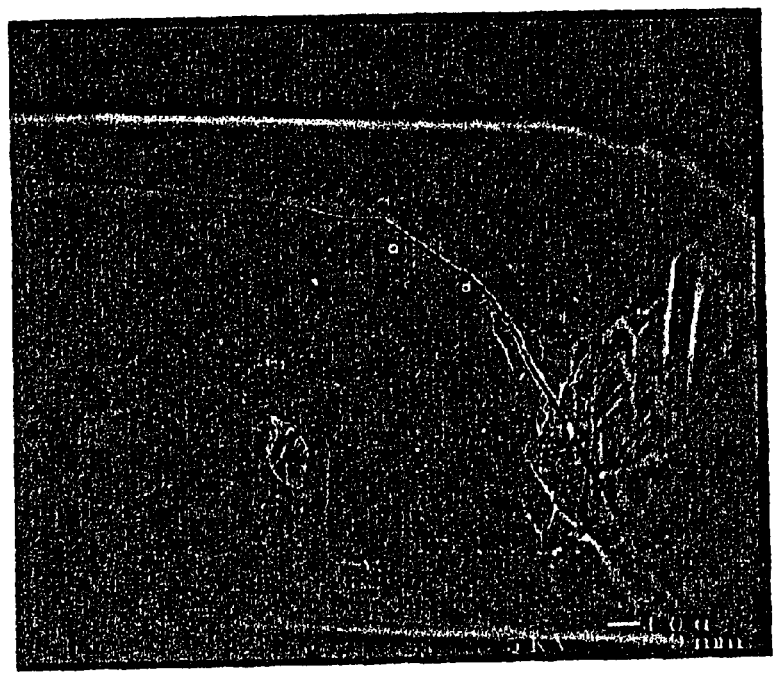

Carbon or ceramic fibers can also be dipped or coated with a solution of the carboxylate-alumoxanes (FIGS. 22, 23, and 24). After drying either in air, in an oven or with a heat gun, the carboxylate-alumoxane can be thermolyzed to give the appropriate ceramic coating with a chemically controlled porosity. Suitable ceramic fibers include (but are not limited to) silicon carbide (FIG. 23) and sapphire (FIG. 24). The conditions of thermolysis of the alumoxane coating are dependent on the type of the fiber and the identity of the carboxylate-alumoxane. The ceramic coatings produced using the carboxylate-alumoxanes show superior coverage, better uniformity, and lower defects than found for sol-gel type coatings, due to the nano-particle nature of the carboxylate-alumoxane. Furthermore, the lowering of phase formation/crystal growth temperatures observed for the carboxylate-alumoxane allow for less damage to the fiber substrate during formation of the ceramic coating.

EXAMPLES

Surface area and pore size analysis were conducted on all samples utilizing a Coulter SA3100 Plus. Sample tubes used are all Coulter Rapi-tubes. Samples were outgassed at 350° C. for 3 hours under nitrogen gas on the SA3100. All sample masses were in the 0.100 g to 0.190 g range. For actual analysis, nitrogen gas was also used as the absorbate and helium gas was used to measure the free-space in the sample tube. BET surface area was determined using 5 data points. The t-plot method was determined utilizing the Harkins-Jura equation at normal resolution. BJH parameters were determined using medium (45 data points) resolution and the equation used was Harkins-Jura. Pore size distributions (and weighted averages) are reported as a function of the BJH adsorption. AFM images of samples were obtained using a Nanoscope IIIa Scanning Probe Microscope, (Digital Instruments, Santa Barbara, Calif.) in tapping mode AFM. FESP tips were used with a pyramidal shape and end radius of 5–10 nm (also from Digital Instruments). Images were taken at scan sizes of 10 $\mu$m, 1 $\mu$m, and 200 nm, and the scan angle was changed from 0 to 45° to check the integrity of the images. Images were later processed to obtain roughness, grain size, and section analysis with the accompanying Nanoscope software. Permeability was derived from Flux experiments using dead end filtration cells from Spectrum and Sartorious. The cells were 400 mL and 200 mL (respectively) and were connected to a tank of zero-air for positive pressure. A pressure regulator was used to set constant pressure for each flux experiment at 10, 20, or 30 psi, and filtrate was collected in beakers and measured volumetrically. Ultrapure deionized water was used, obtained from a Milli-Q water filter. Membrane samples were epoxied to precut aluminum foil disks with precut holes in the center, of known area, matching each membrane piece. The membrane pieces had an area between 0.5 and 2 cm$^2$ and a thickness of 100 to 250 $\mu$m. Prewetted glass fiber supports were placed underneath the membranes to prevent cracking. Contact angle was measured with a goniometer. Samples from flux experiments were used, since they were already mounted on a pliable foil. Samples were placed upside-down on top of a glass container full of deionized water, with the sample submerged. An air bubble was placed on the sample surface and ten readings of the contact angle were read for each side of a bubble. Air bubbles occurring naturally on the membrane surface were measured using the same procedure. Surface charge was determined by measuring the electrophoretic mobility with a Zeta Meter. Membranes were crushed with a mortar and pestle and combined with sodium chloride as an electrolyte to form a 500 mg.L$^{-1}$ alumoxane and 500 mg.L$^{-1}$ NaCl solution. The solutions were set at various pHs using HCl or NaOH, and electrophoretic mobility and zeta potential were measured at several different voltages.

The following examples are presented to illustrate the ease and versatility of the approach and are not to be construed as the only examples of the proposed approach or as limiting the scope of the present invention.

Example 1

Synthesis of methoxy(ethoxyethoxy)acetate-alumoxane (MEEA-A)

Pseudoboehmite (20.0 g) and methoxy(ethoxyethoxy) acetic acid (102 mL) were refluxed in water (400 mL) resulting in a clear solution after 72 h. The solution was centrifuged at 6000 rpm for 1 hour and decanted. Removal of the volatiles in vacuo (10$^{-2}$ Torr) at 90° C. yielded a gel which was then dissolved in ethanol (100 mL) while stirring (10 min.) then triturated with diethyl ether (200 mL). The white solid powder thus obtained was redissolved in water (100 mL) and dried at 50° C. for 24 h resulting in a clear glassy material. The MEEA-alumoxane is soluble in water, methanol, chloroform, and methylene chloride. The alumoxane was heated from 25° C. to 225° C. at the rate of 1° C./min., soaked for 30 mins. at 225° C., followed by a temperature ramp up to 300° C. at the rate of 2° C./min., and soaked for 80 mins., with a final ramp to the maximum temperature of 1100° C. (over 360 minutes) which was then maintained for 400 minutes (FIG.

Example 2

Synthesis of methoxy(ethoxyethoxy)acetate-alumoxane

Methoxy(ethoxyethoxy)acetic acid (60 mL) was dissolved in 300 mL of water and Vista Captal B boehmite (12 g) was slowly added and allowed to reflux for 96 hours. The clear/yellow solution was filtered and the filtrate was evaporated under reduced pressure to a yellow gel. The gel was dissolved in ethanol and the white/yellow powder product was obtained upon addition of diethyl ether. Yield: 13.6 g. The TGA of the methoxy(ethoxy)acetate-alumoxane showed 22.3% ceramic yield (weight loss of 77.7% ). The alumoxane was heated from 25° C. to 200° C. at the rate of 1.5° C.min$^{-1}$, soaked for 2 h. at 200° C., followed by a temperature ramp up to 1000° C. at the rate of 5° C.min$^{-1}$, soaked for 2 h.

Example 3

Synthesis of Methoxy(ethoxy)acetate-alumoxane (MEA-A)

Pseudoboehmite (10.0 g) and methoxy(ethoxy)acetic acid (38.0 mL) were refluxed in water (100 mL) for 24 h, resulting in a clear solution. The solution was centrifuged at 6000 rpm for 1 h and decanted. The water was removed in vacuo (10$^{-2}$ Torr) at 50° C., resulting in a gel. The gel was washed with Et$_2$O (3×75 mL) then dissolved in EtOH (50 mL) while stirring (10 minutes). The MEA-alumoxane was precipitated via the addition of Et$_2$O (100 mL) as a white powder. After drying overnight at 50° C. the solid yield was approximately 25 g. The alumoxane was heated from 25° C. to 225° C. at the rate of 1° C./min., soaked for 30 mins. at 225° C., followed by a temperature ramp up to 300° C. at the rate of 2° C./min., and soaked for 80 mins., with a final ramp to the maximum temperature of 1100° C. (over 360 minutes) which was then maintained for 400 minutes.

Example 4

Synthesis of Methoxy(ethoxy)acetate-alumoxane

Methoxy(ethoxy)acetic acid (152 mL) was dissolved in 400 mL of water and Vista Captal B boehmite (40 g) was slowly added and allowed to reflux for 24 hours. The clear/yellow solution was filtered and the filtrate was evaporated under reduced pressure to a yellow gel. The gel was dissolved in ethanol and the white/yellow powder product was obtained upon addition of diethyl ether. Yield: 82.1 g. The TGA of the methoxy(ethoxy)acetate-alumoxane showed 27.0% ceramic yield (weight loss of 73.0% ). The alumoxane was heated from 25° C. to 200° C. at the rate of 1.5° C.min$^{-1}$, soaked for 2 h. at 200° C., followed by a temperature ramp up to 1000° C. at the rate of 5° C.min$^{-1}$, soaked for 2 h.

Example 5

Synthesis of Methoxyacetate-alumoxane (MA-A)

Pseudoboehmite (10.0 g) and methoxyacetic acid (25.6 mL) were refluxed in water (150 mL) for 24 h. which resulted in a white cloudy solution with a trace of insoluble particles. The water was removed in vacuo (10$^{-2}$ Torr) at 50° C. resulting in a white powder which was washed with diethyl ether (4×150 mL) then dissolved in ethanol (100 mL) while stirring (50 minutes). The alumoxane was precipitated via the addition of ether (300 mL). After drying overnight at 50° C. the solid yield was approximately 20 g. The powder was dissolved in water (100 mL), isolated by filtration, concentrated under vacuum and dried at 50° C. resulting in a white solid material. The alumoxane was heated from 25° C. to 225° C. at the rate of 1° C./min., soaked for 30 mins. at 225° C., followed by a temperature ramp up to 300° C. at the rate of 2° C./min., and soaked for 80 mins., with a final ramp to the maximum temperature of 1100° C. (over 360 minutes) which was then maintained for 400 minutes.

Example 6

Synthesis of Acetate-alumoxane

Pseudoboehmite (20.0 g) was slowly added to a vigorously stirring mixture of acetic acid (51.0 mL) in water (200 mL). The resulting slurry was decanted after 10 minutes and then centrifuged at 6000 rpm for 1 hour to yield a clear viscous solution. Removal of the volatiles in vacuo ($10^{-2}$ Torr) at 90° C. results in clear, white granules. The granules were dissolved in water and dried for 24 hours at 80° C. to yield a clear glassy material. The alumoxane was heated from 25° C. to 225° C. at the rate of 1° C./min., soaked for 30 mins. at 225° C., followed by a temper ramp up to 300° C. at the rate of 2° C./min., and soaked for 80 mins., with a final ramp to the maximum temperature of 1100° C. (over 360 minutes) which was then maintained for 400minutes.

Example 7

Synthesis of Acetate-alumoxane

Acetic acid (80 mL) was dissolved in water (800 mL) to which Vista Captal B boehmite (100 g) was slowly added, and the reaction was stirred for at room temperature for 15 minutes. The clear solution was then decanted into centrifuge bottles and centrifuged at 4100 rpm for 1 hour. The solution was decanted away from the white powder and evaporated under reduced pressure at 80° C., resulting in a white powder. Yield 81.3 g. The TGA of the acetate-alumoxane showed 71.9% ceramic yield (weight loss of 28.1% ). The alumoxane was heated from 25° C. to 200° C. at the rate of 1.5° $C.min^{-1}$, soaked for 2 h. at 200° C., followed by a temperature ramp up to 1000° C. at the rate of 5° $C.min^{-1}$, soaked for 2 h.

Example 8

Synthesis of Acetate-alumoxane

Prepared in an analogous manner to that in Example 7 with the amounts and conditions shown in Table 2.

Example 9

Synthesis of Acetate-alumoxane

Prepared in an analogous manner to that in Example 7 with the amounts and conditions shown in Table 2.

Example 10

Synthesis of Malonate-alumoxane

Malonic acid (5 g) was dissolved in water (50 mL) to which Vista Captal B boehmite (5 g) was slowly added and the reaction was stirred for 30 minutes until a thick gel formed. More water was added to the solution and the reaction was stirred for another 10 min. The resulting solution was filtered and the filtrate was evaporated under reduced pressure resulting in a white powder. Yield 6.75 g. The TGA of the malonate-alumoxane showed 37.1% ceramic yield (weight loss of 62.9%). The alumoxane was heated from 25° C. to 200° C. at the rate of 1.5° $C.min^{-1}$, soaked for 2 h. at 200° C., followed by a temperature ramp up to 1000° C. at the rate of 5° $C.min^{-1}$, soaked for 2 h.

Example 11

Synthesis of Malonate-alumoxane

Prepared in an analogous manner to that in Example 10 with the amounts and conditions shown in Table 3.

Example 12

Synthesis of Malonate-alumoxane

Prepared in an analogous manner to that in Example 10 with the amounts and conditions shown in Table 3.

Example 13

Synthesis of Malonate-alumoxane

Prepared in an analogous manner to that in Example 10 with the amounts and conditions shown in Table 3.

Example 14

Synthesis of Mixed Ligand methoxy(ethoxy) acetate-acetate-alumoxane

Acetic acid (19.0 mL) and methoxy(ethoxy) acetic acid (152.0 mL) was dissolved in 500 mL of water and Vista Captal B boehmite (20 g) was slowly added and refluxed for 72 hours. The white solution was filtered and the filtrate was dissolved under reduced pressure to yield a brown gel. The gel was dissolved in ethanol (100 mL) and the white powder product was obtained by the addition of diethyl ether. Yield: 8.9 g. The TGA of the product showed 32.5% ceramic yield (weight loss of 67.5%). The alumoxane was heated from 25° C. to 200° C. at the rate of 1.5° $C.min^{-1}$, soaked for 2 h. at 200° C., followed by a temperature ramp up to 1000° C. at the rate of 5° $C.min^{-1}$, soaked for 2 h.

Example 15

Synthesis of Mixed Ligand methoxy(ethoxy) acetate-acetate-alumoxane

Prepared in an analogous manner to that in Example 14 with the amounts and conditions shown in Table 4.

Example 16

Synthesis of Mixed Ligand methoxy(ethoxy) acetate-acetate-alumoxane

Prepared in an analogous manner to that in Example 14 with the amounts and conditions shown in Table 4.

Example 17

Synthesis of Mixed Ligand methoxy(ethoxy) acetate-acetate-alumoxane

Prepared in an analogous manner to that in Example 14 with the amounts and conditions shown in Table 4.

Example 18

Synthesis of Mixed Ligand methoxy(ethoxy) acetate-acetate-alumoxane

Prepared in an analogous manner to that in Example 14 with the amounts and conditions shown in Table 4.

Example 19

Synthesis of Mixed Ligand methoxy(ethoxy) acetate-acetate-alumoxane

Prepared in an analogous manner to that in Example 14 with the amounts and conditions shown in Table 4.

Example 20

Synthesis of Mixed Ligand methoxy(ethoxyethoxy) acetate-acetate-alumoxane

Acetic acid (28.6 mL) and methoxy(ethoxyethoxy) acetic acid (76.7 mL) was dissolved in 500 mL of water and Vista Captal B boehmite (20 g) was slowly added and the solution was allowed to reflux for 72 hours. The solution was filtered and the filtrate was evaporated under reduced pressure resulting in a white/clear gel. The gel was dissolved in ethanol and the product was collected as a white powder upon the addition of diethyl ether. Yield: 25.4 g. The TGA of the product showed a 28.5% ceramic yield (weight loss of 71.5%). The alumoxane was heated from 25° C. to 200° C. at the rate of 1.5° C.min$^{-1}$, soaked for 2 h. at 200° C. followed by a temperature ramp up to 1000° C. at the rate of 5° C.min$^{-1}$, soaked for 2 h.

Example 21

Synthesis of Mixed Ligand methoxy(ethoyethoxy) acetate-acetate-alumoxane

Prepared in an analogous manner to that in Example 20 with the amounts and conditions shown in Table 5.

Example 22

Physical Mixing of methoxy(ethoxy)acetate-alumoxane (MEA-A) and acetate-alumoxane (A-A)

MEA-A (1.0 g) and A-A (1.0 g) were dissolved into about 20 mL of water. After stirring for approximately 0.5 hours the solutions were poured into drying containers. After approximately 36 hours, the solutions had evaporated to leave a thin membrane which is glass-like. The glassy membrane is then fired as described in example 2.

Example 23

Physical Mixing of methoxy(ethoxy)acetate-alumoxane (MEA-A) and acetate-alumoxane (A-A)

Prepared in an analogous manner to that in Example 22 with the amounts and conditions shown in Table 6.

Example 24

Physical Mixing of methoxy(ethoxy)acetate-alumoxane (MEA-A) and acetate-alumoxane (A-A)

Prepared in an analogous manner to that in Example 22 with the amounts and conditions shown in Table 6.

Example 25

Physical Mixing of methoxy(ethoxy)acetate-alumoxane (MEA-A) and acetate-alumoxane (A-A)

Prepared in an analogous manner to that in Example 22 with the amounts and conditions shown in Table 6.

Example 26

Physical Mixing of chemically mixed methoxy (ethoxyethoxy)acetate-acetate-alumoxane (MEA/A-A) and acetate-alumoxane (A-A)

MEA/A-A (1.0 g) and A-A (1.0 g) were dissolved into 20 mL of water. After stirring for approximately 0.5 hours the solutions were poured into drying containers. After approximately 36 hours, the solutions had evaporated to leave a thin membrane which is glass-like. The glassy membrane is then fired by the conditions listed in Example 2.

Example 27

Physical Mixing of Chemically Mixed methoxy (ethoxyethoxy)acetate-acetate-alumoxane (MEA/A-A) and acetate-alumoxane (A-A)

Prepared in an analogous manner to that in Example 26 with the amounts and conditions shown in Table 7.

Example 28

Physical Mixing of Chemically Mixed methoxy (ethoxyethoxy)acetate-acetate-alumoxane (MEA/A-A) and acetate-alumoxane (A-A)

Prepared in an analogous manner to that in Example 26 with the amounts and conditions shown in Table 7.

Example 29

Physical Mixing of Chemically Mixed methoxy (ethoxyethoxy)acetate-acetate-alumoxane (MEA/A-A) and acetate-alumoxane (A-A)

Prepared in an analogous manner to that in Example 26 with the amounts and conditions shown in Table 7.

Example 30

Physical Mixing of Chemically Mixed methoxy (ethoxyethoxy)acetate-acetate-alumoxane (MEA/A-A) and acetate-alumoxane (A-A)

Prepared in an analogous manner to that in Example 26 with the amounts and conditions shown in Table 7.

Example 31

Infiltration of alumino-silicate Filters

A filter frit (pore size ca. 25 μm) was placed in a Schleck flask and evacuated. A solution of A-A (10 g) in 100 mL of water was introduced into the Schienk by canula under vacuum which resulted in the ceramic frit "soaking up" the alumoxane solution. The frit was allowed to sit for approximately 0.5 hours under reduced pressure with an excess of the alumoxane solution covering the frit in the schlenk. The frit was then allowed to dry at room temperature. The frit was then either infiltrated again, fired, or fired then infiltrated again.

Example 32

Infiltration of alumino-silicate Filters

Prepared in an analogous manner to that in Example 31 with the number of infiltrations (# dips) and firing sequence shown in Table 9.

Example 33

Infiltration of alumino-silicate Filters

Prepared in an analogous manner to that in Example 31 with the number of infiltrations (# dips) and firing sequence shown in Table 9.

Example 34

Infiltration of alumino-silicate Filters

Prepared in an analogous manner to that in Example 31 with the number of infiltrations (# dips) and firing sequence shown in Table 9.

Example 35

Infiltration of alumino-silicate Filters

Prepared in an analogous manner to that in Example 31 with the number of infiltrations (# dips) and firing sequence shown in Table 9.

Example 36

Infiltration of alumino-silicate Filters

Prepared in an analogous manner to that in Example 31 with the number of infiltrations (# dips) and firing sequence shown in Table 9.

Example 37

Infiltration of alumino-silicate Filters

Prepared in an analogous manner to that in Example 31 with the number of infiltrations (# dips) and firing sequence shown in Table 9.

Example 38

Infiltration of alumino-silicate Filters

Prepared in an analogous manner to that in Example 31 with the number of infiltrations (# dips) and firing sequence shown in Table 9.

Example 39

Infiltration of alumino-silicate Filters

Prepared in an analogous manner to that in Example 31 with the number of infiltrations (# dips) and firing sequence shown in Table 9.

Example 40

Infiltration of alumino-silicate Filters

Prepared in an analogous manner to that in Example 31 with the number of infiltrations (# dips) and firing sequence shown in Table 9.

Example 41

Infiltration of alumino-silicate Filters

Prepared in an analogous manner to that in Example 31 with the number of infiltrations (# dips) and firing sequence shown in Table 9.

Example 42

Infiltration of alumino-silicate Filters

Prepared in an analogous manner to that in Example 31 with the number of infiltrations (# dips) and firing sequence shown in Table 9.

Example 43

Infiltration of alumino-silicate Filters

Prepared in an analogous manner to that in Example 31 with the number of infiltrations (# dips) and firing sequence shown in Table 9.

Example 44

Infiltration of Glass Filters

A glass filter frit (pore size D) was placed in a Schleck flask and evacuated. A solution of A-A.(10 g) in 100 mL of water was introduced into the Schlenk by canula under vacuum which resulted in the glass frit "soaking up" the alumoxane solution. The frit was allowed to sit for approximately 0.5 hours under reduced pressure with an excess of the alumoxane solution covering the frit in the schlenk. The frit was then allowed to dry at room temperature. The infiltration was repeated twice. The infiltrated glass frit was heated from 25° C. to 350° C., analyzed by SEM, heated from 25° C. to 700° C. and analyzed.

Example 45

Infiltration of Glass Filters

Prepared in an analogous manner to that in Example 44 with the number of infiltrations (#4 dips) and firing sequence shown in Table 10.

Example 46

Infiltration of Glass Filters

Prepared in an analogous manner to that in Example 44 with the number of infiltrations (# dips) and firing sequence shown in Table 10.

Example 47

Infiltration of Glass Filters

Prepared in an analogous manner to that in Example 44 with the number of infiltrations (# dips) and firing sequence shown in Table 10.

Example 48

Preparation of Alumina Coated Carbon Fibers

MEEA-alumoxane (0.1 g) was dissolved in $CHCl_3$ (5 mL) at room temperature. The fiber is dipped in MEEA-alumoxane solution and allowed to fully air dry, at room temperature. Repeat dipping/drying until desired coating thickness is obtained. The coated fiber was heated from 25° C. to 225° C. at the rate of 1° $C.min^{-1}$, soaked for 30 mins. at 225° C., follow by a temperature ramp up to 300° C. at the rate of 2° $C.min^{-1}$, and soaked for 80 mins., with a final ramp to the maximum temperature of 1100° C. (over 360 minutes) which was then maintained for 400 minutes.

Example 49

Preparation of Alumina Coated Carbon Fibers

Prepared in an analogous manner to that in Example 48 using the amounts and conditions shown in Table 11.

Example 50

Preparation of Alumina Coated Carbon Fibers

Prepared in an analogous manner to that in Example 48 using the amounts and conditions shown in Table 11.

Example 51

Preparation of Alumina Coated Carbon Fibers

Prepared in an analogous manner to that in Example 48 using the amounts and conditions shown in Table 11.

Example 52

Preparation of Alumina Coated Carbon Fibers

Prepared in an analogous manner to that in Example 48 using the amounts and conditions shown in Table 11.

Example 53

Preparation of Alumina Coated Carbon Fibers

MEEA-alumoxane (0.1 g) was dissolved in $H_2O$ (5 mL) with low heat (40° C.) and stirring. The fiber is dipped in MEEA-Alumoxane solution and allowed to partially dry at room temperature then dried in oven (45° C.) for 24 h. Repeat dipping/drying until desired coating thickness is obtained. The coated fiber was heated from 25° C. to 225° C. at the rate of 1° $C.min^{-1}$, soaked for 30 mins. at 225° C., followed by a temperature ramp up to 300° C. at the rate of 2° $C.min^{-1}$, and soaked for 80 mins., with a final ramp to the maximum temperature of 1100° C. (over 360 minutes) which was then maintained for 400 minutes.

Example 54

Preparation of Alumina Coated Carbon Fibers

Prepared in an analogous manner to that in Example 53 using the amounts and conditions shown in Table 11.

Example 55

Preparation of Alumina Coated Carbon Fibers

Prepared in an analogous manner to that in Example 53 using the amounts and conditions shown in Table 11.

Example 56

Preparation of Alumina Coated Carbon Fibers

Prepared in an analogous manner to that in Example 53 using the amounts and conditions shown in Table 11.

Example 57

Preparation of Alumina Coated Carbon Fibers

Prepared in an analogous manner to that in Example 53 using the amounts and conditions shown in Table 11.

Example 58

Preparation of YAG Coated Carbon Fibers

Yttrium-doped MEEA-alumoxane (0.5 g) was dissolved in $H_2O$ (5 mL) with low heat (40° C.) and stirring. The fiber is dipped in the Y-doped MEEA-alumoxane solution and allowed to partially dry at room temperature then dried in oven (45° C.) for 24 h. Repeat dipping/drying until desired coating thickness is obtained. The coated fiber was heated from 25° C. to 225° C. at the rate of 1° $C.min^{-1}$, soaked for 30 mins. at 225° C., followed by a temperature ramp up to 300 at the rate of 2° $C.min^{-1}$, and soaked for 80 mins., with a final ramp to the maximum temperature of 1100° C. (over 360 minutes) which was then maintained for 400 minutes.

Example 59

Preparation of YAG Coated Carbon Fibers

Prepared in an analogous manner to that in Example 58 using the amounts and conditions shown in Table 11.

Example 60

Preparation of YAG Coated Carbon Fibers

Prepared in an analogous manner to that in Example 58 using the amounts and conditions shown in Table 11.

Example 61

Preparation of Hibonite Coated Carbon Fibers

Calcium-doped MEEA-alumoxane (0.5 g) was dissolved in $H_2O$ (5 mL) with low heat (40° C.) and stirring. The fiber is dipped in the Ca-doped MEEA-alumoxane solution and allowed to partially dry at room temperature then dried in oven (45° C.) for 24 h. Repeat dipping/drying until desired coating thickness is obtained. The coated fiber was heated from 25° C. to 225° C. at the rate of 1° $C.min^{-1}$, soaked for 30 mins. at 225° C., followed by a temperature ramp up to 300°C. at the rate of 2° $C.min^{-1}$, and soaked for 80 mins., with a final ramp to the maximum temperature of 1100° C. (over 360 minutes) which was then maintained for 400 minutes.

Example 62

Preparation of Hibonite Coated Carbon Fibers

Prepared in an analogous manner to that in Example 61 using the amounts and conditions shown in Table 11.

Example 63

Preparation of Hibonite Coated Carbon Fibers

Prepared in an analogous manner to that in Example 61 using the amounts and conditions shown in Table 11.

Example 64

Preparation of Hibonite Coated Carbon Fibers

Calcium-doped MEEA-alumoxane (0.1 g) was dissolved in CHCl3 (5 mL) at room temperature. The fiber is dipped in Ca-doped MEEA-alumoxane solution and allowed to fully air dry, at room temperature. Repeat dipping/drying until desired coating thickness is obtained. The coated fiber was heated from 25° C. to 225° C. at the rate of 1° $C.min^{-1}$, soaked for 30 mins. at 225° C., followed by a temperature ramp up to 300° C. at the rate of 2° $C.min^{-1}$, and soaked for 80 mins., with a final ramp to the maximum temperature of 1100° C. (over 360 minutes) which was then maintained for 400 minutes.

Example 65

Preparation of Hibonite Coated Carbon Fibers

Prepared in an analogous manner to that in Example 61 using the amounts and conditions shown in Table 11.

Example 66

Preparation of Hibonite Coated Carbon Fibers

Prepared in an analogous manner to that in Example 61 using the amounts and conditions shown in Table 11.

Example 67

Preparation of Hibonite Silicon Carbide Fibers

Calcium-doped MEA-alumoxane (0.1 g) was dissolved in $CHCl_3$ (5 mL) at room temperature. The SiC fiber was cleaned with acetone and dipped in a Ca-doped MEA-alumoxane solution and allowed to fully air dry, at room temperature. Repeat dipping/drying until desired coating thickness is obtained. The coated fiber was heated from 25° C. to 225° C. at the rate of 1° C. $min^{-1}$, soaked for 30 mins.

at 225° C., followed by a temperature ramp up to 300° C. at the rate of 2° C.min$^{-1}$, and soaked for 80 mins., with a final ramp to the maximum temperature 1100° C. (over 360 minutes) which was then maintained for 400 minutes.

Example 68

Preparation of Hibonite Coated Silicon Carbide Fibers

Prepared in an analogous manner to that in Example 67 using the amounts and conditions shown in Table 12.

Example 69

Preparation of Hibonite Coated Silicon Carbide Fibers

Prepared in an analogous manner to that in Example 67 using the amounts and conditions shown in Table 12.

Example 70

Preparation of Hibonite Coated Silicon Carbide Fibers

Prepared in an analogous manner to that in Example 67 using the amounts and conditions shown in Table 12.

Example 71

Preparation of Hibonite Coated Silicon Carbide Fibers

Prepared in an analogous manner to that in Example 67 using the amounts and conditions shown in Table 12.

Example 72

Preparation of Hibonite Coated Silicon Carbide Fibers

Prepared in an analogous manner to that in Example 67 using the amounts and conditions shown in Table 12.

Example 73

Preparation of Hibonite Coated Silicon Carbide Fibers

Prepared in an analogous manner to that in Example 67 using the amounts and conditions shown in Table 12.

Example 74

Preparation of Hibonite Silicon Carbide Fibers

Calcium-doped MEA-alumoxane (0.5 g) was dissolved in H$_2$O (5 mL) with low heat (40° C.) and stirring. The fiber is cleaned with acetone and dipped in a metal-doped MEA-alumoxane solution and allowed to partially dry at room temperature then dried in oven (45° C.) 24 h. Repeat dipping/drying until desired coating thickness is obtained. The coated fiber was heated from 25° C. to 225° C. at the rate of 1° C.min$^{-1}$, soaked for 30 mins. at 225° C., followed by a temperature ramp up to 300° C. at the rate of 2° C.min$^{-1}$, and soaked for 80 mins., with a final ramp to the maximum temperature of 1100° C. (over 360 minutes) which was then maintained for 400 minutes.

Example 75

Preparation of Hibonite Coated Silicon Carbide Fibers

Prepared in an analogous manner to that in Example 74 using the amounts and conditions shown in Table 12.

Example 76

Preparation of Hibonite Coated Silicon Carbide Fibers

Prepared in an analogous manner to that in Example 74 using the amounts and conditions shown in fable 12.

Example 77

Preparation of Hibonite Coated Silicon Carbide Fibers

Prepared in an analogous manner to that in Example 74 using the amounts and conditions shown in Table 12.

Example 78

Preparation of Hibonite Coated Silicon Carbide Fibers

Prepared in an analogous manner to that in Example 74 using the amounts and conditions shown in Table 12.

Example 79

Preparation of Hibonite Sapphire Fibers

Calcium-doped MEA-alumoxane (0.1 g) was dissolved in CHCl$_3$ (5 mL) at room temperature. The sapphire fiber was cleaned with acetone and dipped in a Ca-doped MEA-alumoxane solution and allowed to fully air dry, at room temperature. Repeat dipping/drying until desired coating thickness is obtained. The coated fiber was heated from 25° C. to 225° C. at the rate of 1° C.min$^{-1}$, soaked for 30 mins. at 225° C.,followed by a temperature ramp up to 300° C. at the rate of 2° C.min$^{-1}$, and soaked for 80 mins., with a final ramp to the maximum temperature of 1100° C. (over 360 minutes) which was then maintained for 400 minutes.

Example 80

Preparation of Hibonite Coated Sapphire Fibers

Prepared in an analogous manner to that in Example 79 using the amounts and conditions shown in Table 13.

Example 81

Preparation of Hibonite Coated Sapphire Fibers

Prepared in an analogous manner to that in Example 79 using the amounts and conditions shown in Table 13.

Example 82

Preparation of Hibonite Coated Sapphire Fibers

Prepared in an analogous manner to that in Example 79 using the amounts and conditions shown in Table 13.

Example 83

Preparation of Hibonite Coated Sapphire Fibers

Prepared in an analogous manner to that in Example 79 using the amounts and conditions shown in Table 13.

Example 84

Preparation of Hibonite Coated Sapphire Fibers

Prepared in an analogous manner to that in Example 79 using the amounts and conditions shown in Table 13.

Example 85

Preparation of Hibonite Coated Sapphire Fibers

Prepared in an analogous manner to that in Example 79 using the amounts and conditions shown in Table 13.

Example 86

Preparation of Hibonite Sapphire Fibers

Calcium-doped MEA-alumoxane (0.5 g) was dissolved in $H_2O$ (5 mL) with low heat (40° C.) and stirring. The fiber is cleaned with acetone and dipped in a metal-doped MEA-alumoxane solution and allowed to dry at room temperature. Repeat dipping/drying until desired coating thickness is obtained. The coated fiber was heated from 25° C. to 225° C. at the rate of 1° C. $min^{-1}$, soaked for 30 mins. at 225° C., followed by a temperature ramp up to 300° C. at the rate of 2° $C.min^{-1}$, and soaked for 80 mins., with a final ramp to the maximum temperature of 1100° C. (over 360 minutes) which was then maintained for 400 minutes.

Example 87

Preparation of Hibonite Coated Sapphire Fibers

Prepared in an analogous manner to that in Example 86 using the amounts and conditions shown in Table 13.

Example 88

Preparation of Hibonite Coated Sapphire Fibers

Prepared in an analogous manner to that in Example 86 using the amounts and conditions shown in Table 13.

Example 89

Preparation of Hibonite Coated Sapphire Fibers

Prepared in an analogous manner to that in Example 86 using the amounts and conditions shown in Table 13.

Example 90

Preparation of Hibonite Coated Sapphire Fibers

Prepared in an analogous manner to that in Example 86 using the amounts and conditions shown in Table 13.

References

The following are incorporated herein in their entirety for all purposes:

Adkins, A., *J Am. Chem. Soc.*, 44,2175 (1922).
Anderson, M. A.; Gieselman, M. L.; Xu, Q., *J Membrane Sci.*, 39, 243 (1988).
Andrianov K. A.; Zhadanov, A. A., *J. Polym. Sci*, 30, 513 (1958).
Apblett, A. W.; Warren, A. C.; Barron, A. R., *Chem. Mater.*, 4, 167 (1992).
Baker, R. W., *Membrane Separation Systems: Recent Developments and Future Directions,*
Noyes Data Corp., Park Ridge, N.J. (1991).
Baltus, *J Mater. Sci.*, 123, 165 (1997).
Callender, R. L., Harlan, C. J., Shapiro, N. M., Jones, C. D., Callahan, D. L., Wiesner, M. R.,
MacQueen, D. B., Cook, R., Barron, A. R., *Chem. Mater.*, 9, 2418 (1997).
Courtright, E. L., *Ceramic Engineering and Science Proceedings*, 12, 1725 (1991).
Elaloui, E.; Pierre, A. C.; Pajonk, G. M., *J. Catalysis*, 166, 340 (1997).
Furneaux, R. D.; Rigby, W. R.; Davidson, A. P., *Nature*, 337, 147 (1989).
Green R. H.; Hem, S. L., *J Pharm. Sci*, 63, 635 (1974).
Hsieh H. D. in *New Membrane Materials and Processes for Separation*, Ed. K. K. Sirkar and D.
R. Lloyd, American Institute of Chemical Engineering, New York, Vol. 84 (1988).
Kareiva, A.; Harlan, C. J.; MacQueen, D. B.; Cook, R.; Barron, A. R., *Chem. Mater.*, 8, 2331(1996).
Kim, K. J.; Stevens, P. V., *J. Membrane Sci.*, 123, 303 (1997).
Kingery, W. D.; Bowen, H. K.; Uhlmann, D. R. *Introduction to Ceramics*, 2 nd Ed. Wiley, New
York, Chapter 1 (1976).
Landry, C. C.; Davis, J. A.; Apblett, A. W.; Barron, A. R., *J. Mater. Chem.*, 3, 597 (1993).
Landry, C. C.; Pappè, N.; Mason, M. R; Apblett, A. W.; Tyler, A. N.; MacInnes, A. N.; Barron,
A. R., *J. Mater. Chem.*, 5, 331 (1995).
Lao, H.; Detellier, C.; Matsuura, T.; Tremblay, A. Y., *J. Mater. Sci. Letters*, 13, 895 (1994).
Lin, Y. S.; de Vries, K. J.; Burggraaf, A. J., *J. Mater. Sci.*, 26, 715 (1991).
Low, I. M.; Suherman, P. M.; Rhillips, P. N., *J. Mater. Sci. Letters*, 16, 982 (1997).
Michalke T. A.; Hellmann, T. R., *J. Am. Ceram. Soc.*, 71, 725 (1988).
Nikolic, L.; Radonjic, L., *Thin Solid Films*, 295, 101 (1997).
Nogami, M., *J. Non-Cryst. Solids.*, 178, 320 (1994).
Okubo, T.; Watanabe, M.; Kusakabe, K.; Morooka, S., *J. Mater. Sci.*, 25, 4822 (1990).
Rezgui, S; Gates, B. C., *J. Non-Cryst. Solids.*, 210, 287 (1997).
Rezgui, S; Gates, B. C.; Burkett, S. L.; Davis, M. E., *Chem. Mater.*, 6,2390 (1994).
Richerson, D. W., *Modern Ceramic Engineering*, Marcel Dekker, New York, p 373 (1992).
Serna, C. J.; White, J. L.; Hem, S. L., *Soil. Sci.*, 41, 1009 (1977).
Shelleman, R. A.; Messing, G. L.; Kumagai, M., *J. Non-Cryst. Solids*, 82, 277 (1986).
Teichner, S. J.; Nicolaon, G. A.; Vicarini, M. A.; Gardes, G. E. E., *Adv. Coll. Interf. Sci.*, 5, 245(1976).
Wilson, S. J.; Stacey, M. H., *J. Colloid Interface Sci.*, 82, 507 (1981).
Yoldas, B. E., *J. Mat. Sci.*, 10, 1856 (1975).
Zaspalis, V. T.; van Praag, W.; Keizer, K.; Ross, J. R. H.; Burggraaf, A. J., *J. Mater. Sci.*, 27, 1023 (1992).

We claim:

1. A method of controlling the porosity and pore size distribution of a ceramic body comprising:
    selecting a carboxylic acid composition that will result in a desired porosity and pore size distribution;
    reacting boehmite with said carboxylic acid composition to produce carboxylate-alumoxane nanoparticles,
    drying the carboxylate-alumoxane nano-particles,
    re-dissolving the carboxylate-alumoxane nano-particles in a solvent,
    drying the nano-particles, and
    firing the dried nano-particles at a temperature greater than 300° C. so as to form a ceramic body.

2. The method of claim 1 wherein the boehmite is pseudo-boehmite.

3. The method of claim 1 wherein the ceramic body comprises the thermolysis product of a carboxylate-alumoxane represented by the formula $[Al(O)_x(OH)_y(O_2CR)_z]_n$, wherein x is from 0 to 1.5, y is from 0 to 3, z is from 0 to 3, n is greater than 6, and R is hydrogen or an organic group.

4. The method of claim 3 wherein each R, which may be the same or different, is hydrogen or an organic group selected from the group consisting of alkyl, alkenyl, aromatic, haloalkyl, haloalkenyl, and haloaromatic groups or alkyl, alkenyl, and aromatic ether groups or an organic group containing a hetero-atom including, oxygen, nitrogen, sulfur, phosphorous.

5. The method of claim 3 wherein the carboxylate is derived from a carboxylic acid selected from the group consisting of acetic acid, methoxyacetic acid, methoxyethoxyacetic acid, and methoxyethoxyethoxyacetic acid.

6. The method of claim 5 wherein the carboxylate-alumoxane is the reaction product of a carboxylic acid and boehmite.

7. The method of claim 5 wherein the carboxylate-alumoxane is the reaction product of a carboxylic acid and pseudo-boehmite.

8. A method of controlling the porosity and pore size distribution of a aluminum oxide based ceramic body comprising
reacting boehmite with a carboxylic acid to produce carboxylate-alumoxane nanoparticles,
drying the carboxylate-alumoxane nano-particles,
re-dissolving the carboxylate-alumoxane nanoparticles in a solvent,
evaporating the solvent so as to deposit the nanoparticles on a substrate, and
firing the deposited nanoparticles at a temperature greater than 300° C. so as to form an aluminum oxide based ceramic body;
wherein the ceramic body comprises the thermolysis product of a carboxylate-alumoxane represented by the formula $[Al(O)_x(OH)_y(O_2CR)_z]_n$, wherein x is from 0 to 1.5, y is from 0 to 3, z is from 0 to 3, n is greater than 6, and R is hydrogen or an organic group;
wherein the carboxylate is derived from a carboxylic acid selected from the group consisting of acetic acid, methoxyacetic acid, methoxyethoxyacetic acid, and methoxyethoxyethoxyacetic acid; and
wherein the carboxylate-alumoxane is the reaction product of two or more carboxylic acids and boehmite.

9. The method of claim 8 wherein the carboxylate-alumoxane is the reaction product of the sequential reaction of two or more carboxylic acids with boehmite.

10. The method of claim 8 wherein the carboxylate-alumoxane is the reaction product of the parallel reaction of two or more carboxylic acids with boehmite.

11. The method of claim 8 wherein the carboxylate-alumoxane is the reaction product of the sequential reaction of a first carboxylic acid with boehmite to make a product, followed by the reaction of said product with a second carboxylic acid.

12. The method of claim 8 wherein the carboxylate-alumoxane is the reaction product of two or more carboxylic acids and pseudo-boehmite.

13. The method of claim 8 wherein the carboxylate-alumoxane is the reaction product of the sequential reaction of a first carboxylic acid with pseudo-boehmite to make a product, followed by the reaction of said product with a second carboxylic acid.

14. The method of claim 1, further comprising introducing the dissolved carboxylate-alumoxane nanoparticles to a ceramic support.

15. The method of claim 14 wherein deposition of the nanoparticles takes place on the support.

16. The method of claim 15 wherein the support comprises a mold.

17. The method of claim 16 wherein the mold comprises a porous material.

18. The method of claim 17 wherein the porous material comprises a filter.

19. The method of claim 18 wherein the filter comprises a frit.

20. The method of claim 1 wherein the solvent comprises water.

21. The method of claim 1 wherein the ceramic body comprises a membrane.

22. The method of claim 1 further comprising infiltrating the dissolved carboxylate-alumoxane nanoparticles to a ceramic support.

23. A method of controlling the porosity and pore size distribution of a ceramic body comprising
mixing two or more carboxylic acids to produce a carboxylic acid mixture;
reacting boehmite with the carboxylic acid mixture to produce carboxylate-alumoxane nanoparticles,
drying the carboxylate-alumoxane nano-particles,
re-dissolving the carboxylate-alumoxane nano-particles in a solvent,
drying the nano-particles, and
firing the dried nano-particles at a temperature greater than 300° C. so as to form a ceramic body.

24. A method of controlling the porosity and pore size distribution of a ceramic body comprising
reacting boehmite sequentially with two or more carboxylic acids to produce carboxylate-alumoxane nanoparticles,
drying the carboxylate-alumoxane nano-particles,
re-dissolving the carboxylate-alumoxane nano-particles in a solvent,
drying the nano-particles, and
firing the dried nano-particles at a temperature greater than 300° C. so as to form a ceramic body.

25. The method of claim 1 wherein the dried nanoparticles are fired slowly at a temperature sufficient to burn off organic constituents.

26. A method of controlling the porosity and pore size distribution of a ceramic body comprising:
selecting a carboxylic acid composition that will result in a desired porosity and pore size distribution;
reacting boehmite with said carboxylic acid composition to produce carboxylate-alumoxane nanoparticles,
drying the carboxylate-alumoxane nano-particles,
re-dissolving the carboxylate-alumoxane nano-particles in a solvent,
drying the nano-particles, and
firing the dried nano-particles at a temperature between 25° C. and 225° C. so as to form a ceramic body.

27. The method of claim 26 further comprising holding the nanoparticles at a temperature of 225° C. for 30 minutes.

28. The method of claim 26 wherein the nanoparticles are fired at a temperature that is ramped from 25° C. to 225° C. at a rate of 1° C. per minute.

29. The method of claim 28 further comprising holding the nanoparticles at a temperature of 225° C. for 30 minutes.

30. The method of claim 1 further comprising holding the nanoparticles at a temperature of 300° C. for 80 minutes.

31. The method of claim 1 further comprising firing the nanoparticles by ramping the temperature to 1100° C. at a rate of 2° C. per minute.

32. The method of claim 31 further comprising holding the nanoparticles at a temperature of 1100° C. for 400 minutes.

33. The method of claim 31 further comprising cooling the nanoparticles slowly to room temperature.

34. A method of controlling the porosity and pore size distribution of a ceramic body comprising:

a) reacting boehmite or pseudo-boehmite with two or more carboxylic acids to produce carboxylate-alumoxane nanoparticles;

b) drying the carboxylate-alumoxane nano-particles;

c) re-dissolving the carboxylate-alumoxane nano-particles in a solvent;

d) drying the nano-particles; and e) firing the dried nano-particles at a temperature greater than 300° C. so as to form a ceramic body.

* * * * *

UNITED STATES PATENT AND TRADEMARK OFFICE
CERTIFICATE OF CORRECTION

| | | |
|---|---|---|
| PATENT NO. | : 6,936,306 B1 | Page 1 of 1 |
| APPLICATION NO. | : 09/670230 | |
| DATED | : August 30, 2005 | |
| INVENTOR(S) | : Andrew R. Barron et al. | |

It is certified that error appears in the above-identified patent and that said Letters Patent is hereby corrected as shown below:

In column 1, line 16, replace "Not Applicable." with --This invention was made with government support under Grant Number DMI-09613068 awarded by the National Science Foundation (NSF). The government has certain rights in the invention.--

Signed and Sealed this
Twenty-sixth Day of July, 2011

David J. Kappos
*Director of the United States Patent and Trademark Office*